(12) United States Patent
Corbett et al.

(10) Patent No.: US 8,172,033 B2
(45) Date of Patent: May 8, 2012

(54) MATERIALS HANDLING VEHICLE WITH A MODULE CAPABLE OF CHANGING A STEERABLE WHEEL TO CONTROL HANDLE POSITION RATIO

(75) Inventors: Michael Corbett, Saint Marys, OH (US); James F. Schloemer, New Bremen, OH (US); George R. Wetterer, Troy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 469 days.

(21) Appl. No.: 12/360,413

(22) Filed: Jan. 27, 2009

(65) Prior Publication Data
US 2009/0194358 A1    Aug. 6, 2009

Related U.S. Application Data

(60) Provisional application No. 61/026,151, filed on Feb. 5, 2008, provisional application No. 61/026,153, filed on Feb. 5, 2008, provisional application No. 61/049,158, filed on Apr. 30, 2008, provisional application No. 61/055,667, filed on May 23, 2008.

(51) Int. Cl.
*B62D 5/04* (2006.01)
(52) U.S. Cl. ........................................ 180/402; 180/446
(58) Field of Classification Search .................. 180/402, 180/446, 253
See application file for complete search history.

(56) References Cited

U.S. PATENT DOCUMENTS
2,417,850 A    3/1947   Winslow
(Continued)

FOREIGN PATENT DOCUMENTS
CA    2346604 A1    8/2001
(Continued)

OTHER PUBLICATIONS

Rupcic, Zoran; International Search Report and Written Opinion of the International Searching Authority; International Application No. PCT/US2009/032135; May 13, 2009; European Patent Office.

(Continued)

*Primary Examiner* — Paul N Dickson
*Assistant Examiner* — Wesley Potter
(74) *Attorney, Agent, or Firm* — Stevens & Showalter LLP

(57) ABSTRACT

A materials handling vehicle is provided comprising: a frame comprising an operator's compartment; wheels supported on the frame, at least one of the wheels being a steerable wheel; a steer-by-wire system associated with the steerable wheel to effect angular movement of the steerable wheel about a first axis; and a control apparatus. The steer-by-wire system comprises a control handle capable of being moved by an operator to generate a steer control signal, a selection switch capable of generating one of a first select signal and a second select signal, and a steer motor coupled to the steerable wheel to effect angular movement of the steerable wheel about the first axis. The control apparatus may be coupled to the control handle to receive the steer control signal, coupled to the selection switch to receive the one select signal, and coupled to the steer motor to generate a first drive signal to the steer motor to effect angular movement of the steerable wheel about the first axis. The control apparatus may convert the steer control signal to a corresponding desired angular position for the steerable wheel using one of first and second steerable-wheel-to-control-handle-position ratios, wherein the one ratio is selected based on the one select signal.

5 Claims, 19 Drawing Sheets

U.S. PATENT DOCUMENTS

| | | | |
|---|---|---|---|
| 2,575,360 A | 11/1951 | Rabinow | |
| 2,645,297 A | 7/1953 | Wennberg et al. | |
| 2,886,151 A | 5/1959 | Winslow | |
| 3,332,507 A | 7/1967 | Bush | |
| 3,720,281 A | 3/1973 | Frownfelter | |
| 3,791,474 A | 2/1974 | Stammen et al. | |
| 3,946,825 A | 3/1976 | Gail | |
| 4,028,597 A | 6/1977 | Delaney et al. | |
| 4,223,901 A | 9/1980 | Klemick | |
| 4,287,966 A | 9/1981 | Frees | |
| 4,336,860 A | 6/1982 | Noller et al. | |
| 4,354,568 A | 10/1982 | Griesenbrock | |
| 4,386,674 A | 6/1983 | Sugata | |
| 4,392,670 A | 7/1983 | Schultz | |
| 4,500,818 A | 2/1985 | Konrad et al. | |
| 4,520,299 A | 5/1985 | Konrad | |
| 4,588,198 A | 5/1986 | Kanazawa et al. | |
| 4,716,980 A | 1/1988 | Butler | |
| 4,771,846 A | 9/1988 | Venable et al. | |
| 4,834,203 A | 5/1989 | Takahashi | |
| 4,860,844 A | 8/1989 | O'Neil | |
| 4,871,040 A | 10/1989 | Zuraski et al. | |
| 4,936,425 A | 6/1990 | Boone et al. | |
| 4,942,529 A | 7/1990 | Avitan et al. | |
| 4,950,126 A | 8/1990 | Fabiano et al. | |
| 4,992,190 A | 2/1991 | Shtarkman | |
| 5,029,823 A | 7/1991 | Hodgson et al. | |
| 5,032,994 A | 7/1991 | Wellman | |
| 5,067,576 A | 11/1991 | Bober | |
| 5,097,917 A | 3/1992 | Serizawa et al. | |
| 5,151,860 A | 9/1992 | Taniguchi et al. | |
| 5,167,850 A | 12/1992 | Shtarkman | |
| 5,181,173 A | 1/1993 | Avitan | |
| 5,194,851 A | 3/1993 | Kraning et al. | |
| 5,247,441 A | 9/1993 | Serizawa et al. | |
| 5,251,135 A | 10/1993 | Serizawa et al. | |
| 5,277,281 A | 1/1994 | Carlson et al. | |
| 5,284,330 A | 2/1994 | Carlson et al. | |
| 5,293,952 A | 3/1994 | Ledamoisel et al. | |
| 5,299,648 A | 4/1994 | Watanabe et al. | |
| 5,315,295 A | 5/1994 | Fujii | |
| 5,325,935 A | 7/1994 | Hirooka et al. | |
| 5,347,458 A | 9/1994 | Serizawa et al. | |
| 5,354,488 A | 10/1994 | Shtarkman et al. | |
| 5,390,756 A | 2/1995 | Yokoyama | |
| 5,428,537 A | 6/1995 | Kamono et al. | |
| 5,457,632 A | 10/1995 | Tagawa et al. | |
| 5,469,947 A | 11/1995 | Anzai et al. | |
| 5,492,312 A | 2/1996 | Carlson | |
| 5,517,096 A | 5/1996 | Shtarkman et al. | |
| 5,539,397 A | 7/1996 | Asanuma et al. | |
| 5,549,837 A | 8/1996 | Ginder et al. | |
| 5,573,088 A | 11/1996 | Daniels | |
| 5,576,956 A | 11/1996 | Ashizawa et al. | |
| 5,579,228 A | 11/1996 | Kimbrough et al. | |
| 5,579,863 A | 12/1996 | Nelson et al. | |
| 5,598,908 A | 2/1997 | York et al. | |
| 5,652,704 A | 7/1997 | Catanzarite | |
| 5,657,524 A | 8/1997 | Kubala | |
| 5,694,313 A | 12/1997 | Ooiwa | |
| 5,721,566 A | 2/1998 | Rosenberg et al. | |
| 5,732,791 A | 3/1998 | Pinkos et al. | |
| 5,771,989 A | 6/1998 | Sangret | |
| 5,779,013 A | 7/1998 | Bansbach | |
| 5,835,870 A | 11/1998 | Kagawa | |
| 5,842,547 A | 12/1998 | Carlson et al. | |
| 5,845,753 A | 12/1998 | Bansbach | |
| 5,908,457 A | 6/1999 | Higashira et al. | |
| 5,947,238 A | 9/1999 | Jolly et al. | |
| 5,948,029 A | 9/1999 | Straetker | |
| 5,950,518 A | 9/1999 | Pfeifer | |
| 5,964,313 A | 10/1999 | Guy | |
| 6,000,662 A | 12/1999 | Todeschi et al. | |
| 6,041,882 A | 3/2000 | Bohner et al. | |
| 6,059,068 A | 5/2000 | Kato et al. | |
| 6,070,515 A | 6/2000 | Urbach | |
| 6,070,681 A | 6/2000 | Catanzarite et al. | |
| 6,070,691 A | 6/2000 | Evans | |
| 6,079,513 A | 6/2000 | Nishizaki et al. | |
| 6,082,482 A | 7/2000 | Kato et al. | |
| 6,089,344 A | 7/2000 | Baughn et al. | |
| 6,091,214 A | 7/2000 | Yamawaki et al. | |
| 6,097,286 A | 8/2000 | Discenzo | |
| 6,112,845 A | 9/2000 | Oyama et al. | |
| 6,112,846 A | 9/2000 | Mukai et al. | |
| 6,116,372 A | 9/2000 | Mukai et al. | |
| 6,138,788 A | 10/2000 | Bohner et al. | |
| 6,202,806 B1 | 3/2001 | Sandrin et al. | |
| 6,219,604 B1 | 4/2001 | Dilger et al. | |
| 6,227,320 B1 | 5/2001 | Eggert et al. | |
| 6,234,060 B1 | 5/2001 | Jolly | |
| 6,256,566 B1 | 7/2001 | Kamiya et al. | |
| 6,262,712 B1 | 7/2001 | Osborne et al. | |
| 6,271,828 B1 | 8/2001 | Rosenberg et al. | |
| 6,279,952 B1 | 8/2001 | Van Wynsberghe et al. | |
| 6,283,859 B1 | 9/2001 | Carlson et al. | |
| 6,290,010 B1 | 9/2001 | Roudet et al. | |
| 6,300,936 B1 | 10/2001 | Braun et al. | |
| 6,302,249 B1 | 10/2001 | Jolly et al. | |
| 6,310,604 B1 | 10/2001 | Furusho et al. | |
| 6,339,419 B1 | 1/2002 | Jolly et al. | |
| 6,370,459 B1 | 4/2002 | Phillips | |
| 6,370,460 B1 | 4/2002 | Kaufmann et al. | |
| 6,373,465 B2 | 4/2002 | Jolly et al. | |
| 6,378,671 B1 | 4/2002 | Carlson | |
| 6,382,604 B2 | 5/2002 | St. Clair | |
| 6,389,343 B1 | 5/2002 | Hefner et al. | |
| 6,448,728 B2 | 9/2002 | Noro et al. | |
| 6,464,025 B1 | 10/2002 | Koeper et al. | |
| 6,475,404 B1 | 11/2002 | Carlson | |
| 6,484,838 B1 | 11/2002 | Borsting et al. | |
| 6,486,872 B2 | 11/2002 | Rosenberg et al. | |
| 6,491,122 B2 | 12/2002 | Leitner et al. | |
| 6,505,703 B2 * | 1/2003 | Stout et al. | 180/446 |
| 6,507,164 B1 | 1/2003 | Healey et al. | |
| 6,535,806 B2 | 3/2003 | Millsap et al. | |
| 6,547,043 B2 | 4/2003 | Card | |
| 6,550,565 B2 | 4/2003 | Thomas et al. | |
| 6,557,662 B1 | 5/2003 | Andonian et al. | |
| 6,564,897 B2 | 5/2003 | Dammeyer | |
| 6,595,306 B2 | 7/2003 | Trego et al. | |
| 6,609,052 B2 | 8/2003 | Radamis et al. | |
| 6,612,392 B2 | 9/2003 | Park et al. | |
| 6,612,929 B2 | 9/2003 | Fujimoto et al. | |
| 6,619,444 B2 | 9/2003 | Menjak et al. | |
| 6,625,530 B1 | 9/2003 | Bolourchi | |
| 6,636,197 B1 | 10/2003 | Goldenberg et al. | |
| 6,637,558 B2 | 10/2003 | Oliver et al. | |
| 6,640,940 B2 | 11/2003 | Carlson | |
| 6,655,490 B2 | 12/2003 | Andonian et al. | |
| 6,655,494 B2 | 12/2003 | Menjak et al. | |
| 6,659,218 B2 | 12/2003 | Thomas et al. | |
| 6,678,595 B2 | 1/2004 | Zheng et al. | |
| 6,681,881 B2 | 1/2004 | Andonian et al. | |
| 6,681,882 B2 | 1/2004 | Zheng et al. | |
| 6,688,420 B2 | 2/2004 | Zheng et al. | |
| 6,705,424 B2 * | 3/2004 | Ogawa et al. | 180/446 |
| 6,736,234 B2 | 5/2004 | Zheng et al. | |
| 6,752,039 B2 | 6/2004 | Kreuzer et al. | |
| 6,752,425 B2 | 6/2004 | Loh et al. | |
| 6,757,601 B1 | 6/2004 | Yao et al. | |
| 6,761,243 B2 | 7/2004 | Stout et al. | |
| 6,776,249 B2 | 8/2004 | Fortin | |
| 6,799,654 B2 | 10/2004 | Menjak et al. | |
| 6,817,437 B2 | 11/2004 | Magnus et al. | |
| 6,854,573 B2 | 2/2005 | Jolly et al. | |
| 6,883,625 B2 | 4/2005 | Trego et al. | |
| 6,899,196 B2 | 5/2005 | Husain et al. | |
| 6,910,699 B2 | 6/2005 | Cherney | |
| 6,912,831 B2 | 7/2005 | Velke et al. | |
| 6,920,753 B2 | 7/2005 | Namuduri | |
| 6,957,873 B2 | 10/2005 | Wanke et al. | |
| 6,962,231 B2 | 11/2005 | Carlsson et al. | |
| 6,968,262 B2 | 11/2005 | Higashi et al. | |
| 6,997,763 B2 | 2/2006 | Kaji | |
| 6,999,862 B2 | 2/2006 | Tamaizumi et al. | |
| 7,017,689 B2 | 3/2006 | Gilliland et al. | |

| | | | | | | |
|---|---|---|---|---|---|---|
| 7,025,157 | B2 | 4/2006 | Lindsay et al. | GB | 2263179 | 7/1993 |
| 7,040,427 | B2 | 5/2006 | Toomey | GB | 2310413 | 8/1997 |
| 7,113,166 | B1 | 9/2006 | Rosenberg et al. | GB | 2351953 | 1/2001 |
| 7,165,643 | B2 | 1/2007 | Bozem et al. | GB | 2378165 | 2/2003 |
| 7,178,613 | B2 * | 2/2007 | Yanaka et al. ............... 180/6.32 | GB | 2404179 A | 1/2006 |
| 7,207,411 | B2 | 4/2007 | Duits et al. | JP | 39759 | 1/1939 |
| 7,213,678 | B2 | 5/2007 | Park | JP | 57120730 | 7/1982 |
| 7,226,069 | B2 | 6/2007 | Ueda et al. | JP | 60080969 A | 5/1985 |
| 7,234,563 | B2 | 6/2007 | Ogawa et al. | JP | 61070617 A | 4/1986 |
| 7,240,485 | B2 | 7/2007 | Namuduri et al. | JP | 61196863 | 9/1986 |
| 7,257,947 | B2 | 8/2007 | Namuduri | JP | 61275059 | 12/1986 |
| 7,302,329 | B2 | 11/2007 | McDonald et al. | JP | 62198564 | 9/1987 |
| 7,353,099 | B2 | 4/2008 | Lindsay et al. | JP | 63082873 | 4/1988 |
| 7,720,584 | B2 * | 5/2010 | Ogawa et al. ................... 701/42 | JP | 1131348 | 5/1989 |
| 7,831,355 | B2 | 11/2010 | Nishiyama | JP | 2120527 | 5/1990 |
| 2001/0042655 | A1 | 11/2001 | Dammeyer | JP | 02212272 | 8/1990 |
| 2001/0052756 | A1 | 12/2001 | Noro et al. | JP | 04108071 | 4/1992 |
| 2002/0079157 | A1 | 6/2002 | Song | JP | 4108071 | 4/1992 |
| 2002/0087242 | A1 | 7/2002 | Kawashima | JP | 04133860 | 5/1992 |
| 2002/0095224 | A1 | 7/2002 | Braun et al. | JP | 4357312 | 12/1992 |
| 2003/0028306 | A1 | 2/2003 | Fujimori | JP | 4358967 | 12/1992 |
| 2003/0029648 | A1 | 2/2003 | Trego et al. | JP | 4372471 | 12/1992 |
| 2003/0079923 | A1 | 5/2003 | Johnson | JP | 06087453 | 3/1994 |
| 2003/0114270 | A1 * | 6/2003 | Wuertz et al. ............... 477/111 | JP | 06092246 | 4/1994 |
| 2003/0168275 | A1 | 9/2003 | Sakugawa | JP | 6107026 | 4/1994 |
| 2004/0046346 | A1 * | 3/2004 | Eki et al. ............... 280/93.502 | JP | 06255522 | 9/1994 |
| 2004/0099453 | A1 | 5/2004 | Guy | JP | 07165091 | 6/1995 |
| 2004/0104066 | A1 | 6/2004 | Sakai | JP | 07269604 | 10/1995 |
| 2004/0231902 | A1 | 11/2004 | Carlson et al. | JP | 8117588 | 5/1996 |
| 2005/0016779 | A1 | 1/2005 | Lindsay et al. | JP | 8127790 | 5/1996 |
| 2005/0023066 | A1 | 2/2005 | McGoldrick | JP | 08253159 | 10/1996 |
| 2005/0055149 | A1 | 3/2005 | Kato et al. | JP | 08277853 | 10/1996 |
| 2005/0087384 | A1 | 4/2005 | Magnus et al. | JP | 08292712 | 11/1996 |
| 2005/0199436 | A1 | 9/2005 | Schroder et al. | JP | 08337171 | 12/1996 |
| 2005/0247508 | A1 | 11/2005 | Gilliland et al. | JP | 09142330 | 6/1997 |
| 2005/0281656 | A1 | 12/2005 | Bozem et al. | JP | 09226607 | 9/1997 |
| 2006/0006027 | A1 | 1/2006 | Carlson et al. | JP | 10171542 | 6/1998 |
| 2006/0089778 | A1 | 4/2006 | Lindsay et al. | JP | 10177378 | 6/1998 |
| 2006/0090967 | A1 | 5/2006 | Bernd et al. | JP | 10184758 | 7/1998 |
| 2006/0169499 | A1 | 8/2006 | Gotz | JP | 10217998 | 8/1998 |
| 2006/0178799 | A1 | 8/2006 | Hoying et al. | JP | 10226346 | 8/1998 |
| 2006/0197741 | A1 | 9/2006 | Biggadike | JP | 10250617 | 9/1998 |
| 2006/0200291 | A1 | 9/2006 | Wroblewski | JP | 10297519 | 11/1998 |
| 2006/0225947 | A1 * | 10/2006 | Nyberg ............... 180/446 | JP | 10307661 | 11/1998 |
| 2006/0231301 | A1 | 10/2006 | Rose et al. | JP | 11132259 | 5/1999 |
| 2006/0231302 | A1 | 10/2006 | Rose | JP | 2914165 | 6/1999 |
| 2006/0245866 | A1 | 11/2006 | Rose et al. | JP | 11255134 | 9/1999 |
| 2006/0259221 | A1 | 11/2006 | Murty et al. | JP | 11513192 | 11/1999 |
| 2007/0013655 | A1 | 1/2007 | Rosenberg et al. | JP | 2000072399 A | 3/2000 |
| 2007/0080037 | A1 | 4/2007 | Larry et al. | JP | 2000181618 | 6/2000 |
| 2007/0095040 | A1 * | 5/2007 | Berkeley ............... 56/10.8 | JP | 2001352612 A | 12/2001 |
| 2007/0137904 | A1 * | 6/2007 | Rose et al. ............... 180/19.1 | JP | 2003306160 | 10/2003 |
| 2007/0257552 | A1 | 11/2007 | Hehl | JP | 2004090758 | 3/2004 |
| 2007/0278032 | A1 | 12/2007 | Sakaguchi et al. | JP | 2004140908 A | 5/2004 |
| 2009/0194357 | A1 | 8/2009 | Wetterer et al. | JP | 2005096894 A | 4/2005 |
| 2009/0194363 | A1 | 8/2009 | Crabill et al. | JP | 2005170136 | 6/2005 |
| 2009/0198416 | A1 | 8/2009 | Wetterer et al. | JP | 2007130309 | 5/2007 |
| 2009/0222168 | A1 | 9/2009 | Egenfeldt | JP | 2007168617 | 7/2007 |
| 2010/0063682 | A1 | 3/2010 | Akaki | KR | 20020044975 A | 6/2002 |
| | | | | KR | 20040096679 A | 11/2004 |

FOREIGN PATENT DOCUMENTS

| | | |
|---|---|---|
| DE | 3830836 | 3/1990 |
| DE | 19901451 | 7/2000 |
| DE | 10033107 | 1/2001 |
| DE | 102005011998 A1 | 10/2005 |
| DE | 102005012004 A1 | 10/2005 |
| DE | 602004009363 T2 | 3/2008 |
| EP | 0442570 | 8/1991 |
| EP | 0726193 | 8/1996 |
| EP | 0872405 | 10/1998 |
| EP | 1013537 | 6/2000 |
| EP | 1125825 | 4/2002 |
| EP | 1533211 | 10/2004 |
| EP | 1481944 A2 | 12/2004 |
| EP | 1505034 A2 | 2/2005 |
| EP | 1655211 A2 | 5/2006 |
| EP | 1475297 B8 | 12/2007 |
| GB | 649553 | 1/1951 |
| GB | 2087513 | 5/1982 |
| WO | 9642078 | 12/1996 |
| WO | 9715058 | 4/1997 |
| WO | 9926230 | 5/1999 |
| WO | 03010040 A1 | 2/2003 |
| WO | 2006113510 A2 | 10/2006 |
| WO | 2006113510 A3 | 10/2006 |
| WO | 2007106714 A2 | 9/2007 |

OTHER PUBLICATIONS

Rupcic, Zoran; International Search Report and Written Opinion of the International Searching Authority; International Application No. PCT/US2009/032146; May 18, 2009; European Patent Office.

Rupcic, Zoran; International Search Report and Written Opinion of the International Searching Authority; International Application No. PCT/US2009/032141; May 19, 2009; European Patent Office.

Leroy, Douglas F.; MR Technology, Tactile Feedback and Application of By-Wire Systems; Equipment Technology; Utility & Telecom Fleets; May 2007; pp. 35-38.

Leroy, Douglas F.; Steer-by-Wire Challenges Hydraulics; Machine Design.com; Aug. 10, 2006.

Zheng, Bing; Fault Tolerant Steer-by-Wire Road Wheel Control System; 2005 American Control Conference; Jun. 8-10, 2005; pp. 1619-1624; Portland, OR.

Crown Equipment Corporation; PE 4000 PE 4500 Series; 2006; New Bremen, OH.

U.S. Appl. No. 12/360,353, filed Jan. 27, 2009 entitled, "A Materials Handling Vehicle Having a Control Apparatus for Determining an Acceleration Value".

U.S. Appl. No. 12/360,385, filed Jan. 27, 2009 entitled, "A Materials Handling Vehicle Having a Steer System Including a Tactile Feedback Device".

U.S. Appl. No. 12/360,297, filed Jan. 27, 2009 entitled, "A Materials Handling Vehicle Having a Steer System Including a Tactile Feedback Device".

Crown Equipment Corporation; PC 3600 Series; 2005; New Bremen, OH.

Tactile Feedback Devices for Steer-by-Wire; pp. 22-29.

D. Carlson et al.; Magneto-Rheological Technology and Applications; 2007; pp. 1-28; Lord Corporation; Lord France.

Sharke, Paul; Tip-proofing: a forklift maker takes control of the wheel; Mechanical Engineering-CIME; Mar. 1, 2005.

* cited by examiner

MATERIALS HANDLING VEHICLE WITH A MODULE CAPABLE OF CHANGING A STEERABLE WHEEL TO CONTROL HANDLE POSITION RATIO

This application claims the benefit of: U.S. Provisional Application No. 61/026,151, filed Feb. 5, 2008 and entitled "A MATERIALS HANDLING VEHICLE HAVING A STEER SYSTEM INCLUDING A TACTILE FEEDBACK DEVICE"; U.S. Provisional Application No. 61/026,153, filed Feb. 5, 2008 and entitled "A MATERIALS HANDLING VEHICLE HAVING A CONTROL APPARATUS FOR DETERMINING AN ACCELERATION VALUE"; U.S. Provisional Application No. 61/049,158, filed Apr. 30, 2008 and entitled "A MATERIALS HANDLING VEHICLE HAVING A STEER SYSTEM INCLUDING A TACTILE FEEDBACK DEVICE"; U.S. Provisional Application No. 61/055,667, filed May 23, 2008 and entitled "A MATERIALS HANDLING VEHICLE WITH A MODULE CAPABLE OF CHANGING A STEERABLE WHEEL TO CONTROL HANDLE POSITION RATIO," the disclosures of which are incorporated herein by reference.

FIELD OF THE INVENTION

The present invention relates to a materials handling vehicle having a control module capable of changing a steerable wheel to control handle position ratio.

BACKGROUND OF THE INVENTION

U.S. Pat. No. 6,564,897 discloses a steer-by-wire system for a materials handling vehicle. The vehicle comprises a steering tiller. The tiller, however, is not mechanically coupled to a steered wheel. A motor or an electromagnetic brake is used to provide a counter steering resistive force.

SUMMARY OF THE INVENTION

In accordance with a first aspect of the present invention, a materials handling vehicle is provided comprising: a frame comprising an operator's compartment; wheels supported on the frame, at least one of the wheels being a steerable wheel; a steer-by-wire system associated with the steerable wheel to effect angular movement of the steerable wheel about a first axis; and a control apparatus. The steer-by-wire system comprises a control handle capable of being moved by an operator to generate a steer control signal, a selection switch capable of generating one of a first select signal and a second select signal, and a steer motor coupled to the steerable wheel to effect angular movement of the steerable wheel about the first axis. The control apparatus may be coupled to the control handle to receive the steer control signal, coupled to the selection switch to receive the one select signal, and coupled to the steer motor to generate a first drive signal to the steer motor to effect angular movement of the steerable wheel about the first axis. The control apparatus may convert the steer control signal to a corresponding desired angular position for the steerable wheel using one of first and second steerable-wheel-to-control-handle-position ratios, wherein the one ratio is selected based on the one select signal.

In one embodiment, the selection switch comprises a speed selection switch. The first select signal may comprise a low speed select signal and the second select signal may comprise a high speed select signal.

The control apparatus may select the first ratio when the one select signal is equal to the low speed select signal and the control apparatus may select the second ratio when the one select signal is equal to the high speed select signal, wherein the first ratio may be greater than the second ratio.

The control apparatus may change the one steerable-wheel-to-control handle-position ratio in response to the selection switch changing the one select signal and the vehicle being stopped. Alternatively, the control apparatus may change the one steerable-wheel-to-control handle-position ratio in response to the selection switch changing the one select signal, the control handle being located in a position within a first predefined range, the steerable wheel being located in a position within a second predefined range and an error between a desired angular position of the steerable wheel and a determined actual position of the steerable wheel is equal to or less than a predefined value.

The first and second predefined ranges may be equal to ±3 degrees of a centered position and the predefined value may be equal to 3.

In a further embodiment of the present invention, the selection switch may comprise a maneuverability switch. The first select signal may comprise a low resolution select signal and the second select signal may comprise a high resolution select signal.

The control apparatus may select the first ratio when the one select signal is equal to the low resolution signal and the control apparatus may select the second ratio when the one select signal is equal to the high resolution signal, wherein the first ratio is greater than the second ratio.

BRIEF DESCRIPTION OF THE DRAWINGS

FIG. 6A is a view, partially in cross section, of a pin extending down from a control handle base, a spring and a block fixed to a steering column plate;

DETAILED DESCRIPTION OF THE INVENTION

Figure 1:
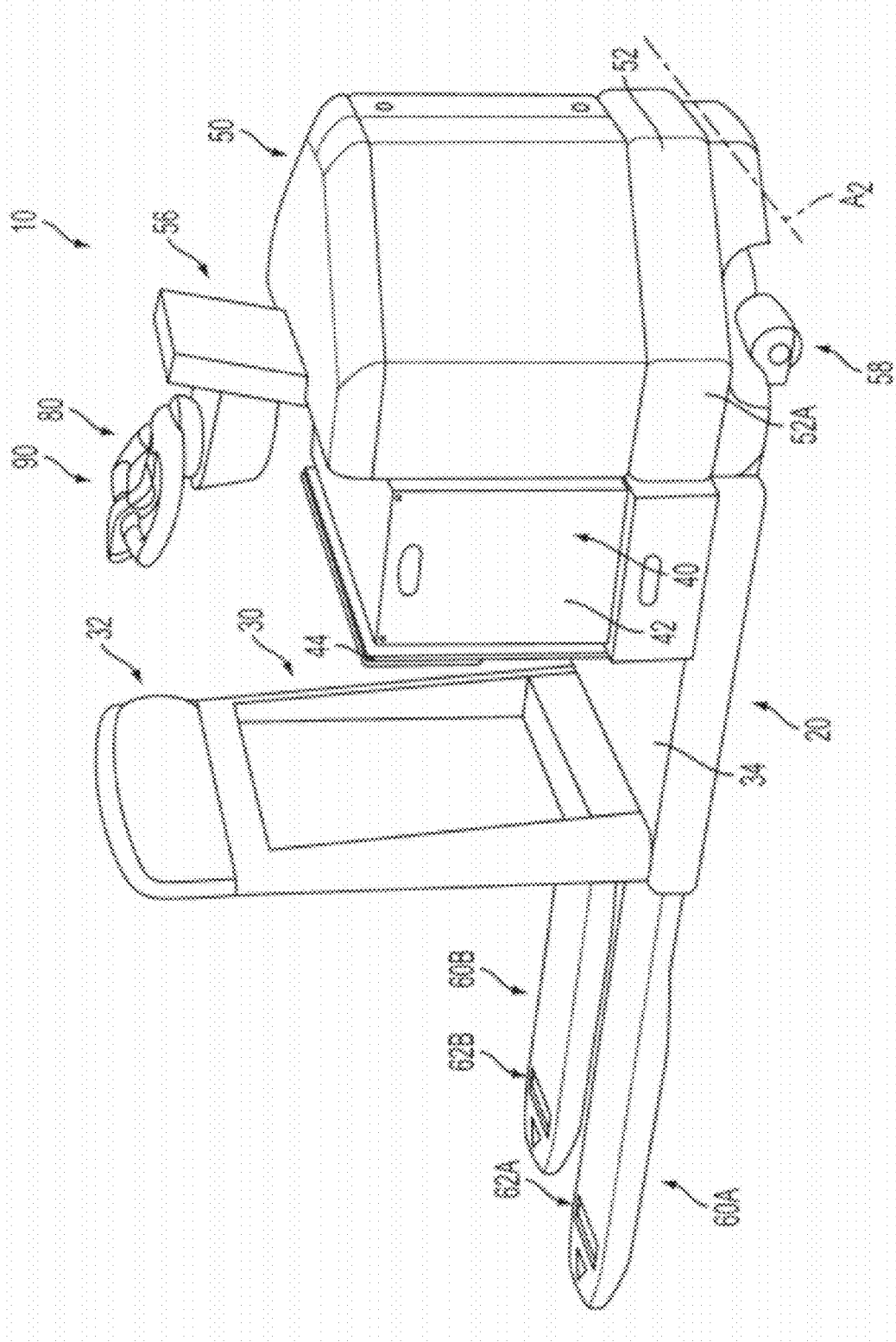
FIG. 1 is a perspective view of a materials handling vehicle in which the present invention is incorporated.

A materials handling vehicle constructed in accordance with the present invention, comprising a pallet truck 10 in the illustrated embodiment, is shown in FIG. 1. The truck 10 comprises a frame 20 including an operator's compartment 30, a battery compartment 40 for housing a battery 42, a base 52 forming part of a power unit 50 and a pair of load carrying forks 60A and 60B. Each fork 60A, 60B comprises a corresponding load wheel assembly 62A, 62B. When the load wheel assemblies 62A, 62B are pivoted relative to the forks 60A, 60B, the forks 60A, 60B are moved to a raised position. The operator's compartment 30 and the battery compartment 40 move with the forks 60A, 60B relative to the power unit 50.

Figure 1A:
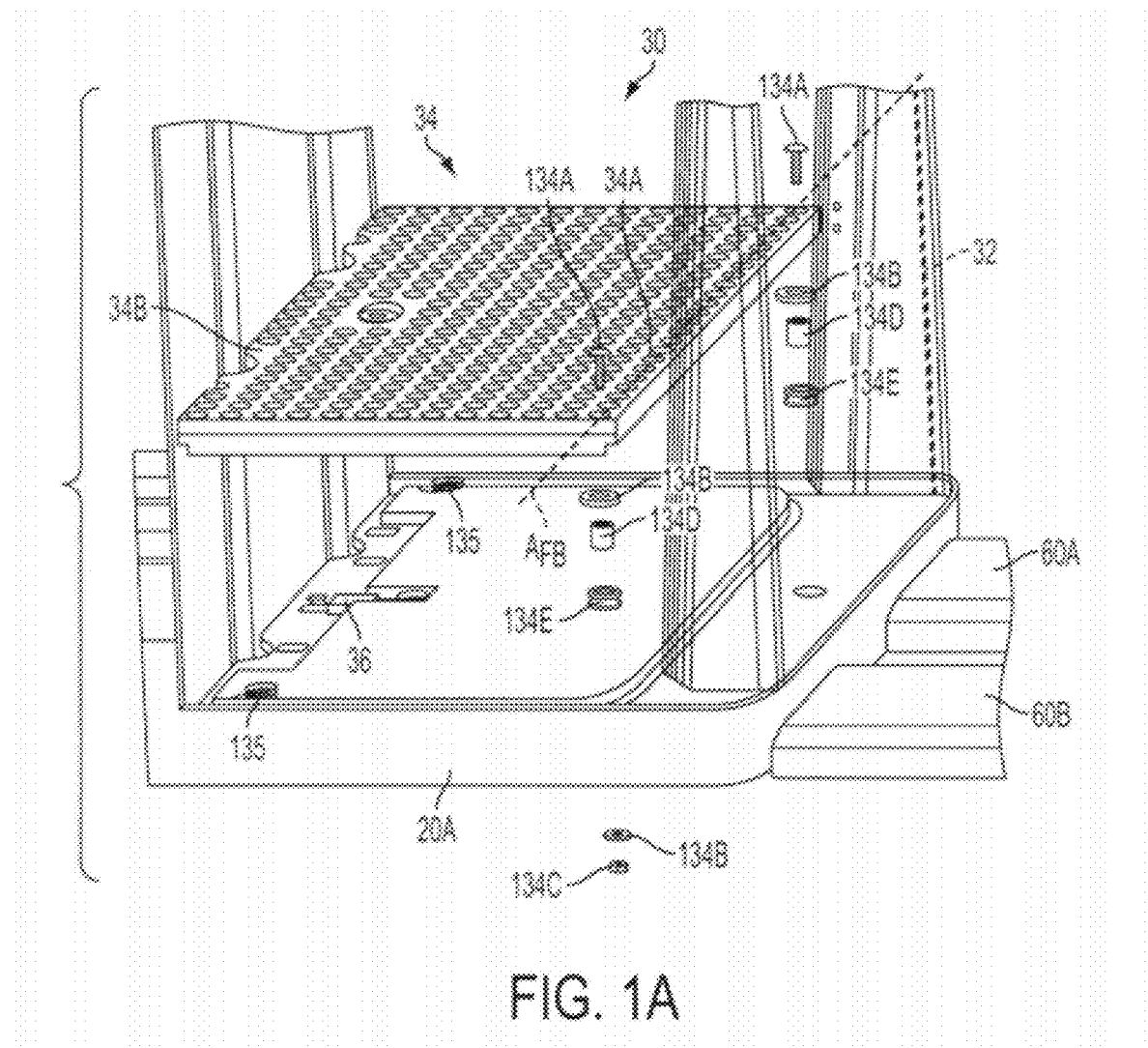
FIG. 1A is an exploded view of a portion of an operator's compartment including a floorboard from the vehicle illustrated in FIG. 1.
Figure 2:
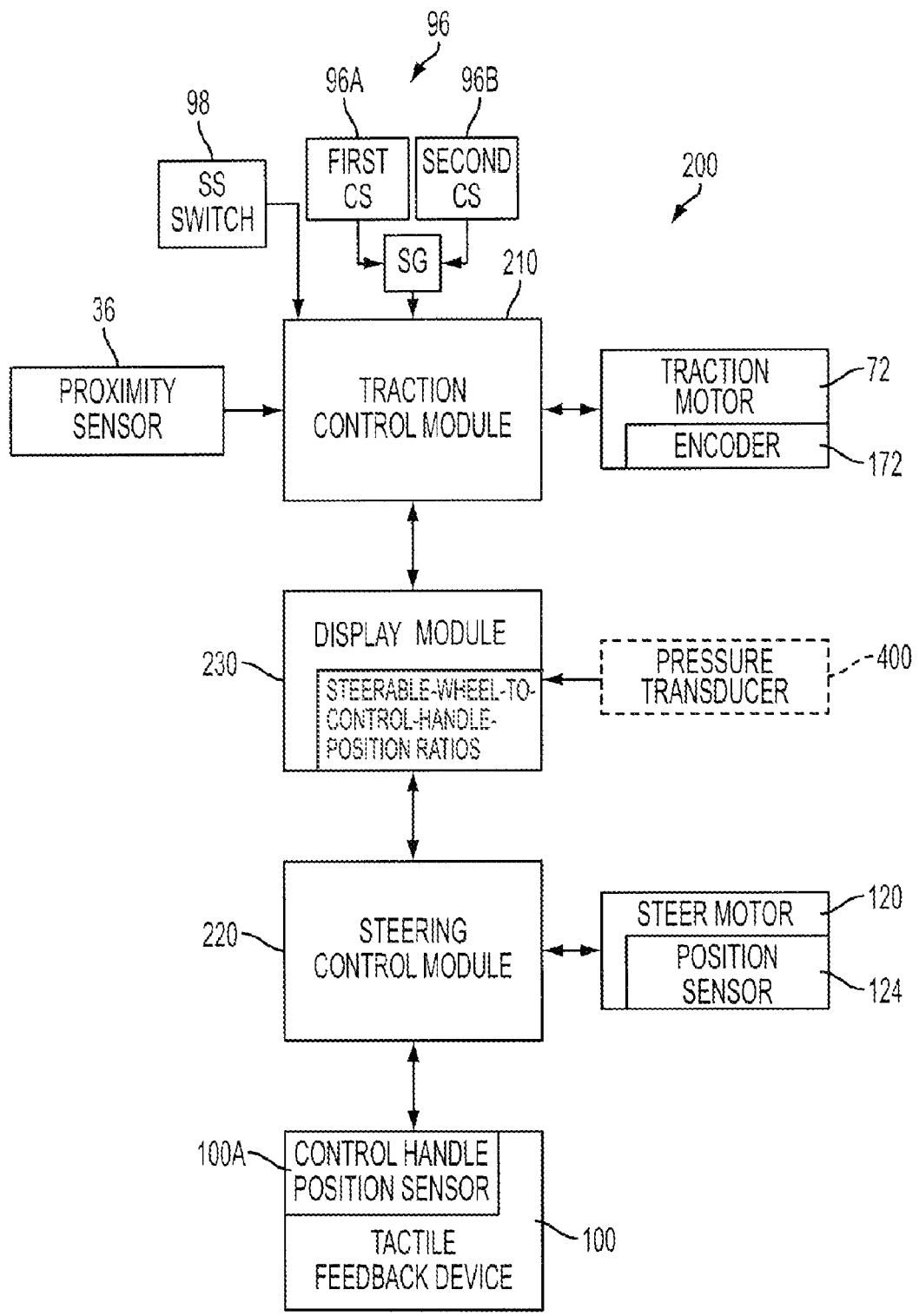
FIG. 2 is a schematic block diagram of a control apparatus from the vehicle illustrated in FIG. 1.

The operator's compartment 30 is defined by an operator's backrest 32, a side wall 44 of the battery compartment 40 and a floorboard 34. An operator stands on the floorboard 34 when positioned within the operator's compartment 30. In the illustrated embodiment, the floorboard 34 is coupled to a frame base 20A along a first edge portion 34A via bolts 134A, washers 134B, nuts 134C, spacers 134D and flexible grommets 134E, see FIG. 1A. A second edge portion 34B of the floorboard 34, located opposite to the first edge portion 34A, rests upon a pair of springs 135. The floorboard 34 is capable of pivoting about an axis $A_{FB}$, which axis $A_{FB}$ extends through the first edge portion 34A and the flexible grommets 134E. A proximity sensor 36, see FIGS. 1A and 2, is positioned adjacent to the floorboard 34 for sensing the position of the floorboard 34. When an operator is standing on the floorboard 34, it pivots about the axis $A_{FB}$ and moves towards the proximity sensor 36 such that the floorboard 34 is sensed by the sensor 36. When the operator steps off of the floorboard 34, the floorboard 34 is biased in a direction away from the sensor 36 by the springs 135 such that it is no longer sensed by the sensor 36. Hence, the proximity sensor 36 generates an operator status signal indicating that either an operator is standing on the floorboard 34 in the operator's compartment 30 or no operator is standing on the floorboard 34 in the operator's compartment 30. A change in the operator status signal indicates that an operator has either entered or exited the operator's compartment 30.

The power unit 50 comprises the base 52, a side wall 54 and a steering column 56, see FIGS. 3-8. The base 52, side wall 54 and steering column 56 are fixed together such that the steering column 56 does not rotate or move relative to the side wall 54 or the base 52 in the illustrated embodiment. First and second caster wheels, only the first caster wheel 58 is illustrated in FIG. 1, are coupled to the base 52 on opposing sides 52A and 52B of the base 52.

Figure 3:
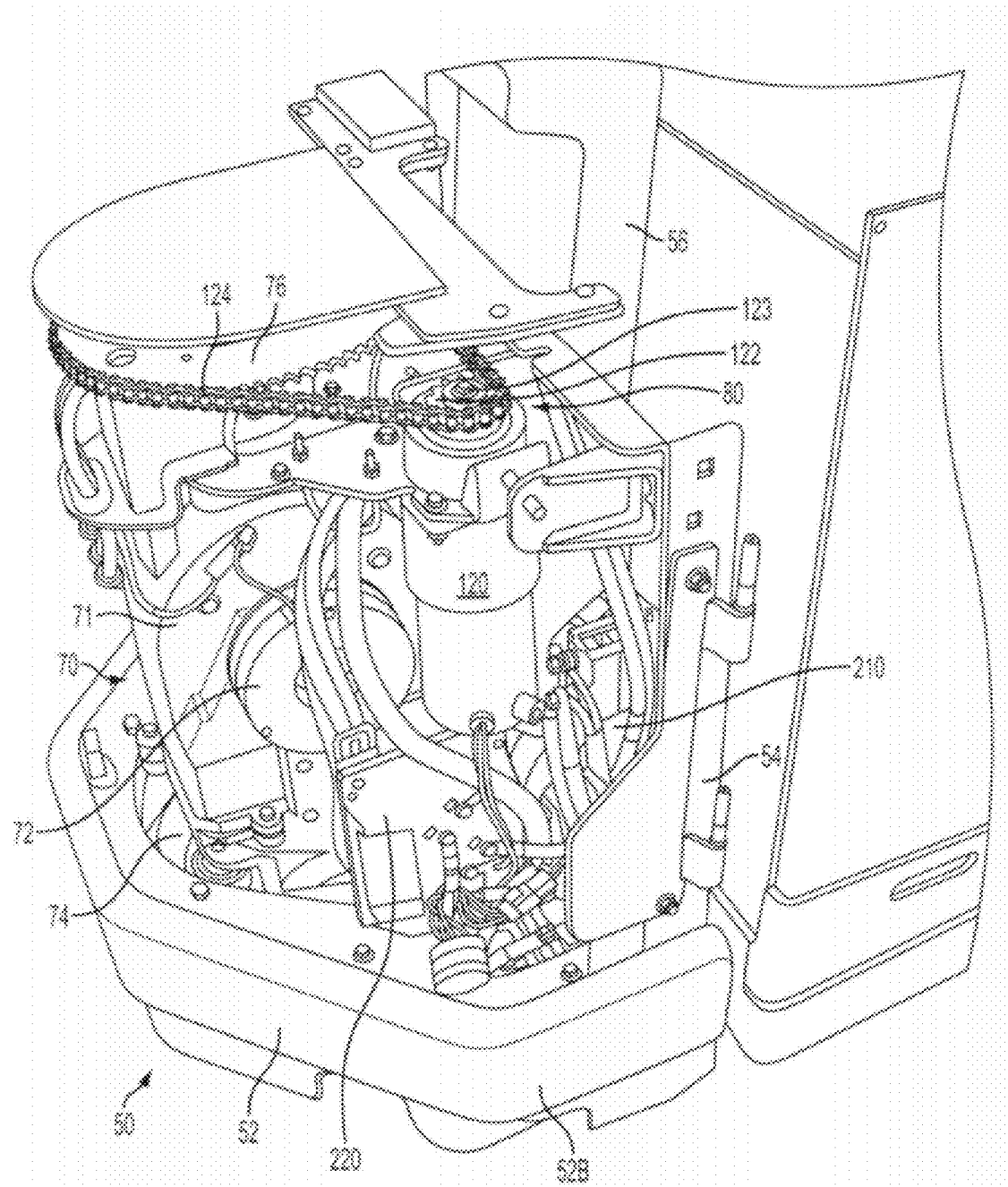
FIGS. 3-5 are perspective views of a power unit of the vehicle in FIG. 1 with covers removed from the power unit.
Figure 4:
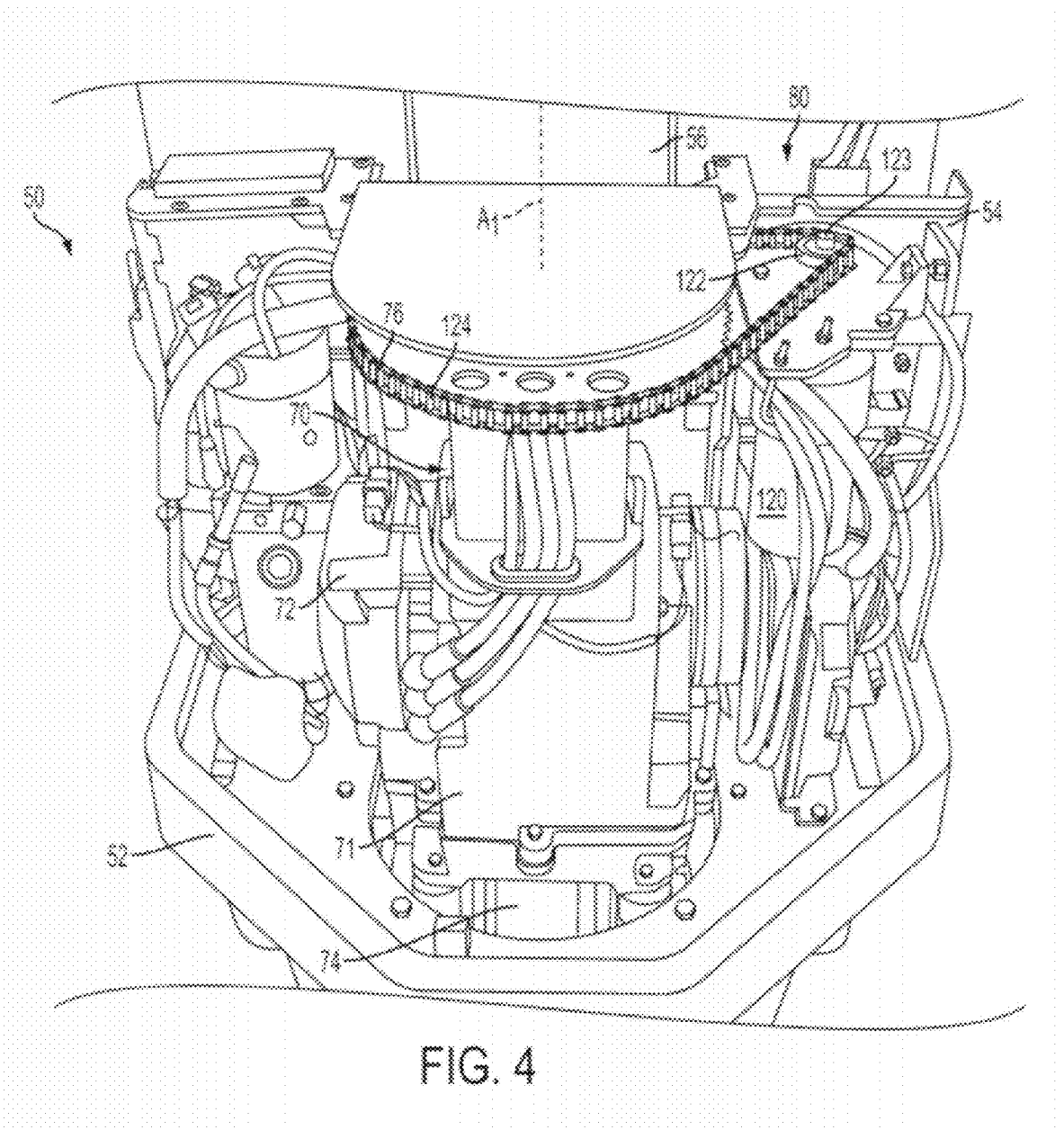
Figure 5:
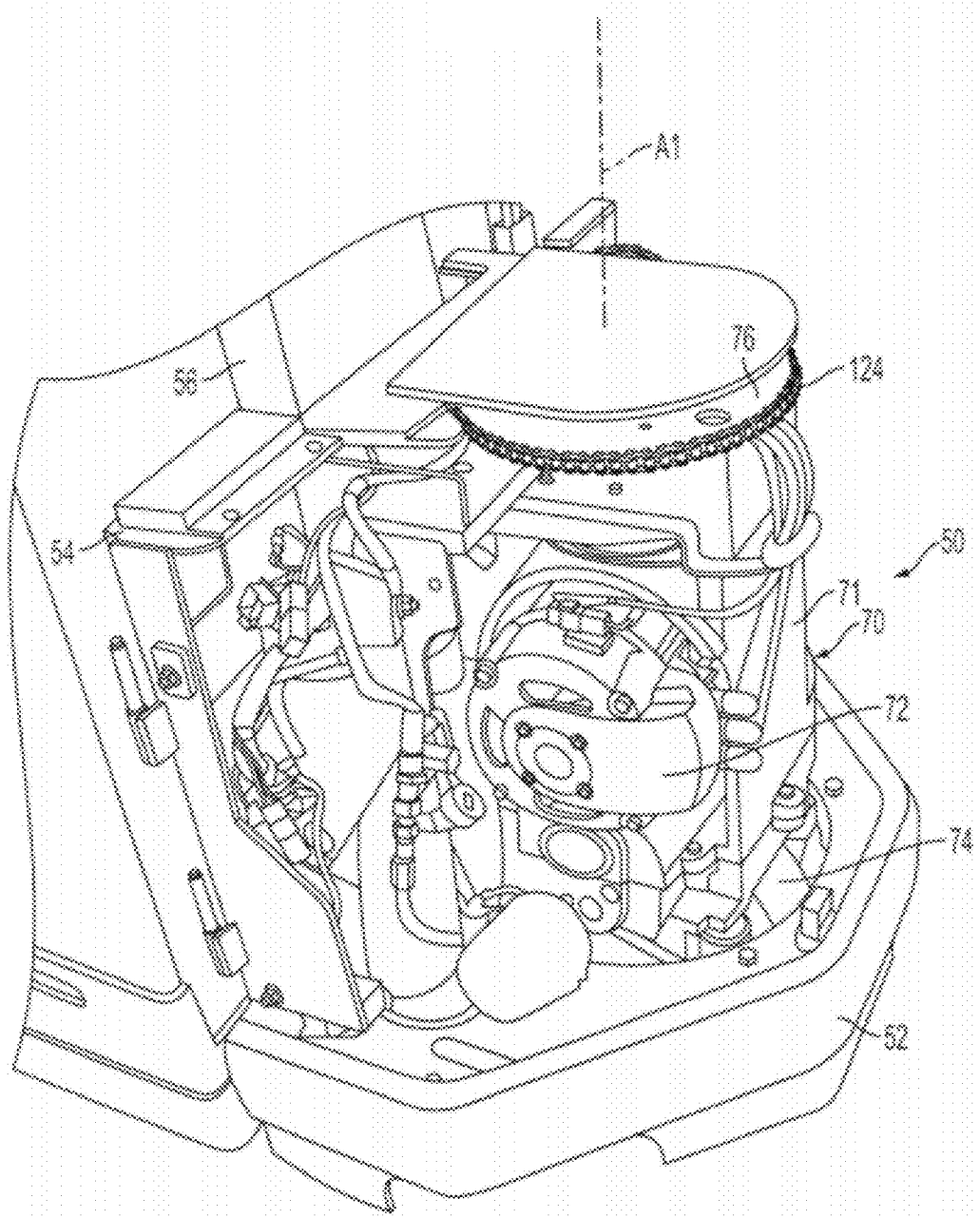

The power unit 50 further comprises a drive unit 70 mounted to the base 52 so as to be rotatable relative to the base 52 about a first axis $A_1$, see FIGS. 4 and 5. The drive unit 70 comprises a support structure 71 mounted to the base 52 so as to be rotatable relative to the base 52, a traction motor 72 mounted to the support structure 71, and a driven steerable wheel 74 mounted to the support structure 71, see FIGS. 3-5. The steerable wheel 74 is coupled to the traction motor 72 so as to be driven by the traction motor 72 about a second axis $A_2$, see FIG. 1. The steerable wheel 74 also moves together with the traction motor 72 and the support structure 71 about the first axis $A_1$.

An encoder 172, see FIG. 2, is coupled to an output shaft (not shown) of the traction motor 72 to generate signals indicative of the speed and direction of rotation of the traction motor 72.

The truck 10 comprises a steer-by-wire system 80 for effecting angular movement of the steerable wheel 74 about the first axis $A_1$. The steer-by-wire system 80 comprises the control handle 90, a tactile feedback device 100, biasing structure 110, a steer motor 120 and the steerable wheel 74, see FIGS. 3, 4, 6 and 9. The steer-by-wire system 80 does not comprise a mechanical linkage structure directly connecting the control handle 90 to the steerable wheel 74 to effect steering of the wheel 74. The term "control handle" is intended to encompass the control handle 90 illustrated in FIG. 1 and like control handles including steering tillers and steering wheels.

The control handle 90 is capable of being rotated by an operator approximately ±60 degrees from a centered position, wherein the centered position corresponds to the steerable wheel 74 being located in a straight-ahead position. The control handle 90 is coupled to the tactile feedback device 100, which, in turn, is coupled to a plate 56A of the steering column 56 via bolts 101, shown in FIG. 6 but not shown in FIG. 9. The bolts 101 pass through bores in the plate 56A and engage threaded bores in a boss 106, shown in FIG. 9, of the tactile feedback device 100. The tactile feedback device 100 may comprise an electrically controlled brake capable of generating a resistance or counter force that opposes movement of the control handle 90, wherein the force varies based on a magnitude of a tactile feedback device signal, which signal will be discussed below. For example, the electrically controlled brake may comprise one of an electrorheological device, a magnetorheological device, and an electromagnetic device. In the illustrated embodiment, the tactile feedback device 100 comprises a device commercially available from the Lord Corporation under the product designation "RD 2104-01."

Figure 9:
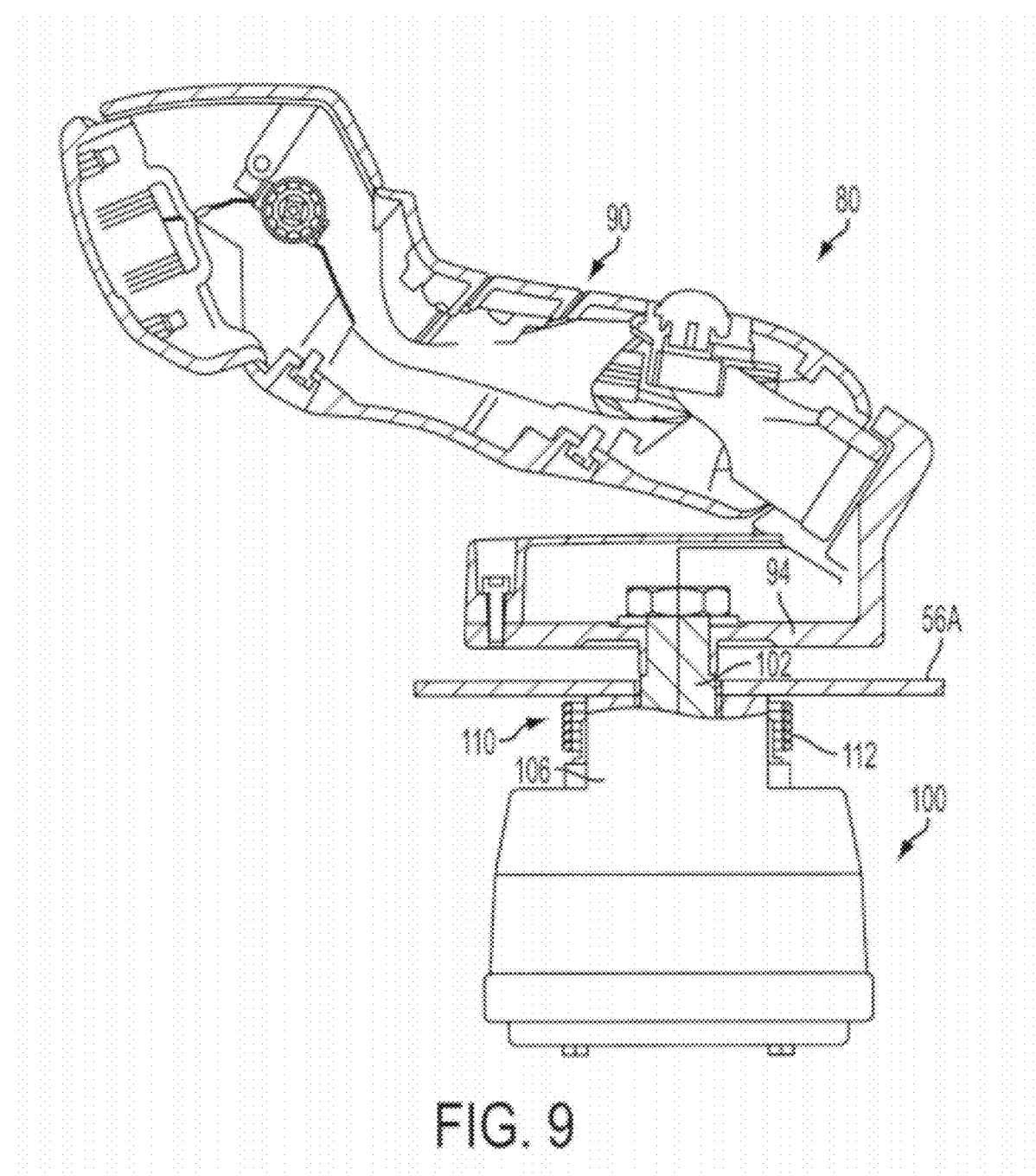
FIG. 9 is a view, partially in section, of the control handle and the tactile feedback device.

As illustrated in FIG. 9, the control handle 90 is fixedly coupled to a shaft 102 of the tactile feedback device 100 such that the control handle 90 and the shaft 102 rotate together. A magnetically controllable medium (not shown) is provided within the device 100. A magnetic field generating element (not shown) forms part of the device 100 and is capable of generating a variable strength magnetic field that changes with the tactile feedback device signal. The magnetically controllable medium may have a shear strength that changes in proportion to the strength of the magnetic field, and provides a variable resistance or counter force to the shaft 102, which force is transferred by the shaft 102 to the control handle 90. As the variable resistance force generated by the tactile feedback device 100 increases, the control handle 90 becomes more difficult to rotate by an operator.

The tactile feedback device 100 further comprises a control handle position sensor 100A, shown in FIG. 2 but not shown in FIG. 9, which senses the angular position of the control handle 90 within the angular range of approximately ±60 degrees in the illustrated embodiment. The control handle position sensor 100A comprises, in the illustrated embodiment, first and second potentiometers, each of which senses the angular position of the shaft 102. The second potentiometer generates a redundant position signal. Hence, only a single potentiometer is required to sense the angular position of the shaft 102. The angular position of the shaft 102 corresponds to the angular position of the control handle 90. An operator rotates the control handle 90 within the angular range of approximately ±60 degrees in the illustrated embodiment to control movement of the steerable wheel 74, which wheel 74 is capable of rotating approximately ±90 degrees from a centered position in the illustrated embodiment. As the control handle 90 is rotated by the operator, the control handle position sensor 100A senses that rotation, i.e., magnitude and direction, and generates a steer control signal corresponding to a desired angular position of the steerable wheel 74 to a steering control module 220 (also referred to herein as a steering control unit 220).

Figure 6:
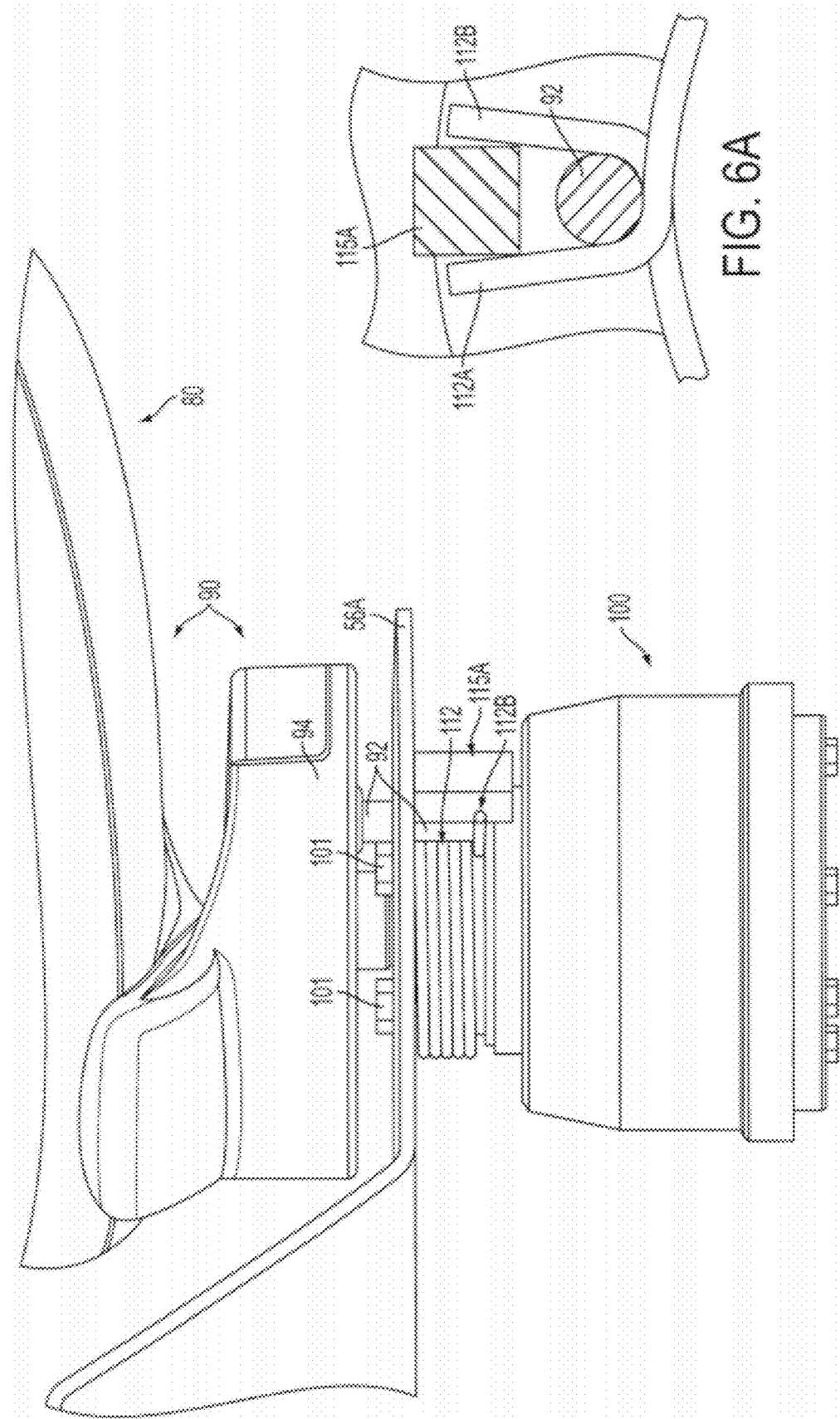
FIG. 6 is a view of a tactile feedback device of the vehicle illustrated in FIG. 1.

The biasing structure 110 comprises a coiled spring 112 in the illustrated embodiment, see FIGS. 6, 6A and 9, having first and second ends 112A and 112B. The spring 112 is positioned about the boss 106 of the tactile feedback device 100, see FIG. 9. A pin 92, shown in FIGS. 6 and 6A but not shown in FIG. 9, extends down from a base 94 of the control handle 90 and moves with the control handle 90. When the control handle 90 is located in its centered position, the pin 92 is positioned between and adjacent to the first and second spring ends 112A and 112B, see FIG. 6A. The spring ends 112A and 112B engage and rest against a block 115A fixed to and extending down from the plate 56A of the steering column 56 when the control handle 90 is in its centered position, see FIGS. 6 and 6A. As the control handle 90 is rotated by an operator away from its centered position, the pin 92 engages and pushes against one of the spring ends 112A, 112B, causing that spring end 112A, 112B to move away from the block 115A. In response, that spring end 112A, 112B applies a return force against the pin 92 and, hence, to the control handle 90, in a direction urging the control handle 90 to return to its centered position. When the operator is no longer gripping and turning the control handle 90 and any resistance force generated by the tactile feedback device 100 is less than that of the biasing force applied by the spring 112, the spring 112 causes the control handle 90 to return to its centered position.

Figure 7:
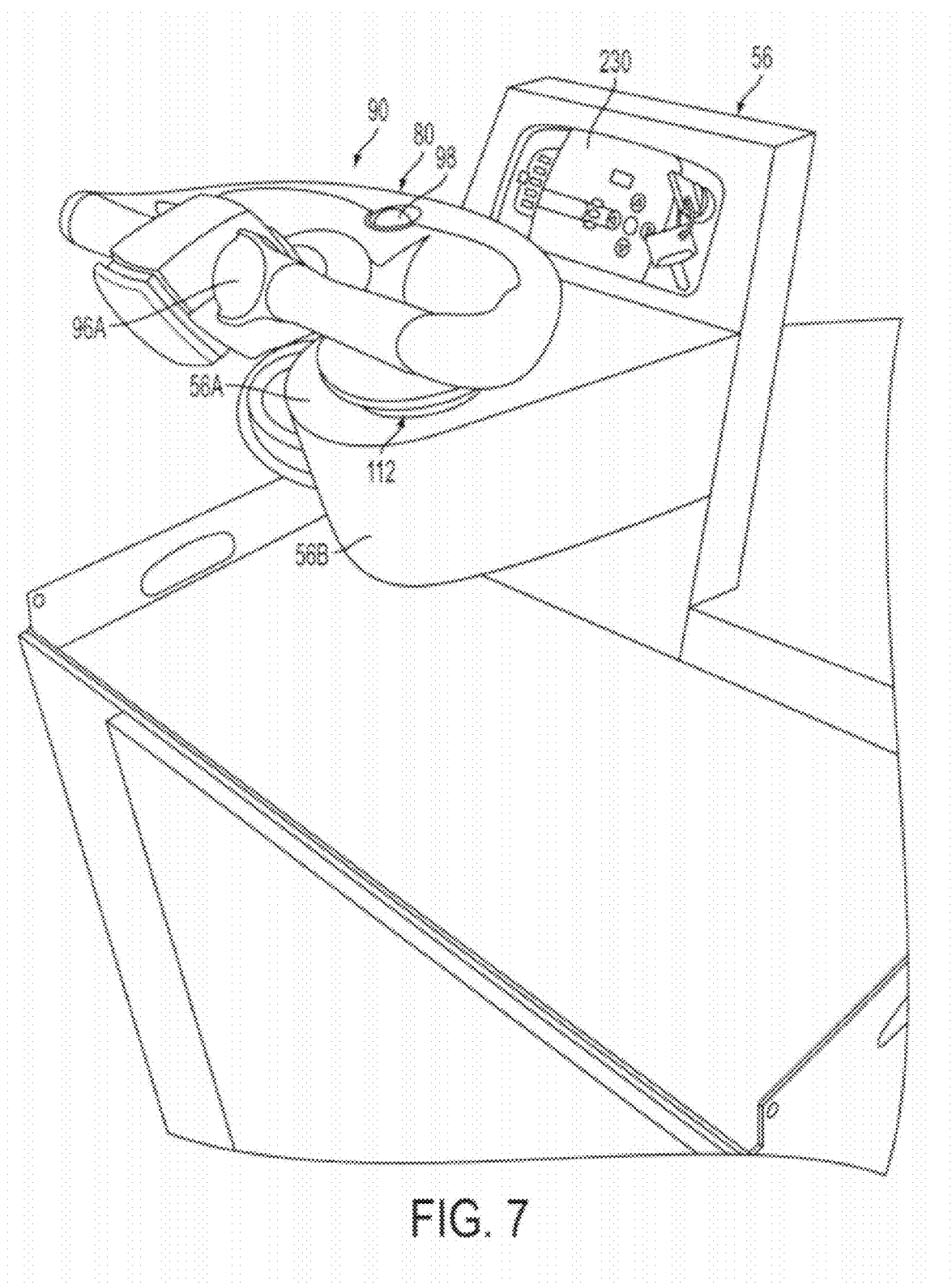
FIGS. 7 and 8 are perspective views of the control handle of the vehicle illustrated in FIG. 1.
Figure 8:
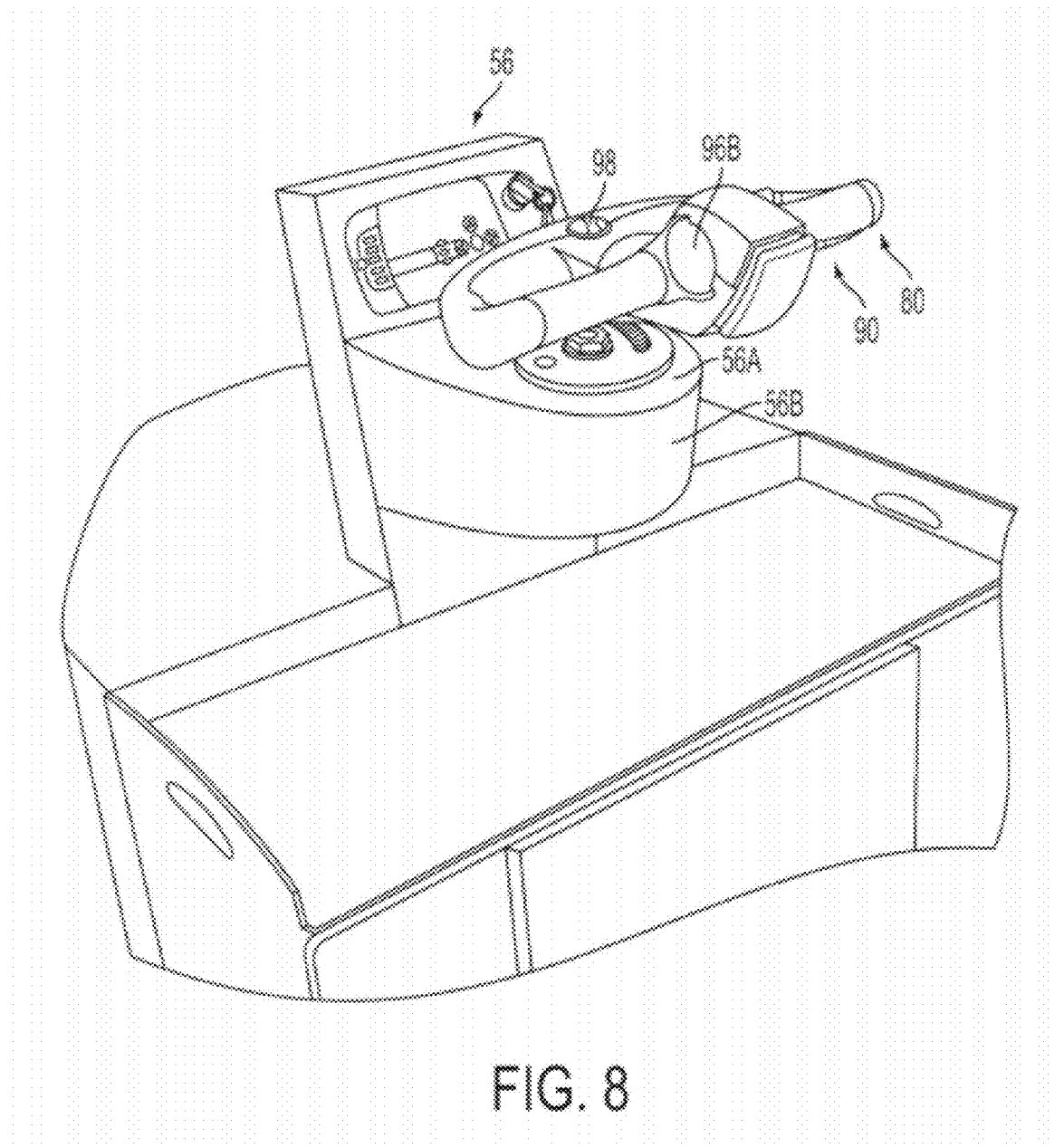

The steering column 56 further comprises a cover portion 56B, shown only in FIGS. 7 and 8 and not in FIGS. 6 and 9, which covers the tactile feedback device 100.

The steer motor 120 comprises a drive gear 122 coupled to a steer motor output shaft 123, see FIGS. 3 and 4. The drive unit 70 further comprises a rotatable gear 76 coupled to the support structure 71 such that movement of the rotatable gear 76 effects rotation of the support structure 71, the traction motor 72 and the steerable wheel 74 about the first axis $A_1$, see FIGS. 3-5. A chain 124 extends about the drive gear 122 and the rotatable gear 76 such that rotation of the steer motor output shaft 123 and drive gear 122 causes rotation of the drive unit 70 and corresponding angular movement of the steerable wheel 74.

The vehicle 10 further comprises a control apparatus 200, which, in the illustrated embodiment, comprises a traction control module 210, the steering control module 220 and a display module 230, see FIGS. 2, 3 and 7. Each of the modules 210, 220 and 230 comprises a controller or processor for effecting functions to be discussed below. The functions effected by the modules 210, 220 and 230 may alternatively be performed by a single module, two modules or more than three modules. It is also contemplated that the functions discussed herein performed by one module, e.g., the traction control module 210, may be performed by another module, e.g., the steering control module 220. Further, inputs received by one module, e.g., the steering control module 220, may be shared by that module with the remaining modules or a same input may be separately provided by a sensor or input device to two or more modules. The traction control module 210 is mounted to the side wall 54, the steering control module 220 is mounted to the base 52 and the display module 230 is mounted within the steering column 56.

The control handle 90 further comprises first and second rotatable speed control elements 96A and 96B forming part of a speed control apparatus 96. One or both of the speed control elements 96A, 96B may be gripped and rotated by an operator to control a direction and speed of movement of the vehicle 10, see FIGS. 2, 7 and 8. The first and second speed control elements 96A and 96B are mechanically coupled together such that rotation of one element 96A, 96B effects rotation of the other element 96B, 96A. The speed control elements 96A and 96B are spring biased to a center neutral or home position and coupled to a signal generator SG, which, in turn, is coupled to the traction control module 210. The signal generator SG, for example, a potentiometer, forms part of the speed control apparatus 96 and is capable of generating a speed control signal to the traction control module 210. The speed control signal varies in sign based on the direction of rotation of the speed control elements 96A, 96B, clockwise or counterclockwise from their home positions, and magnitude based on the amount of rotation of the speed control elements 96A, 96B from their home positions. When an operator rotates a control element 96A, 96B in a clockwise direction, as viewed in FIG. 7, a speed control signal is generated to the traction control module 210 corresponding to vehicle movement in a power unit first direction. When the operator rotates a control element 96A, 96B in a counter-clockwise direction, as viewed in FIG. 7, a speed control signal is generated to the traction control module 210 corresponding to vehicle movement in a forks first direction.

Figure 11:
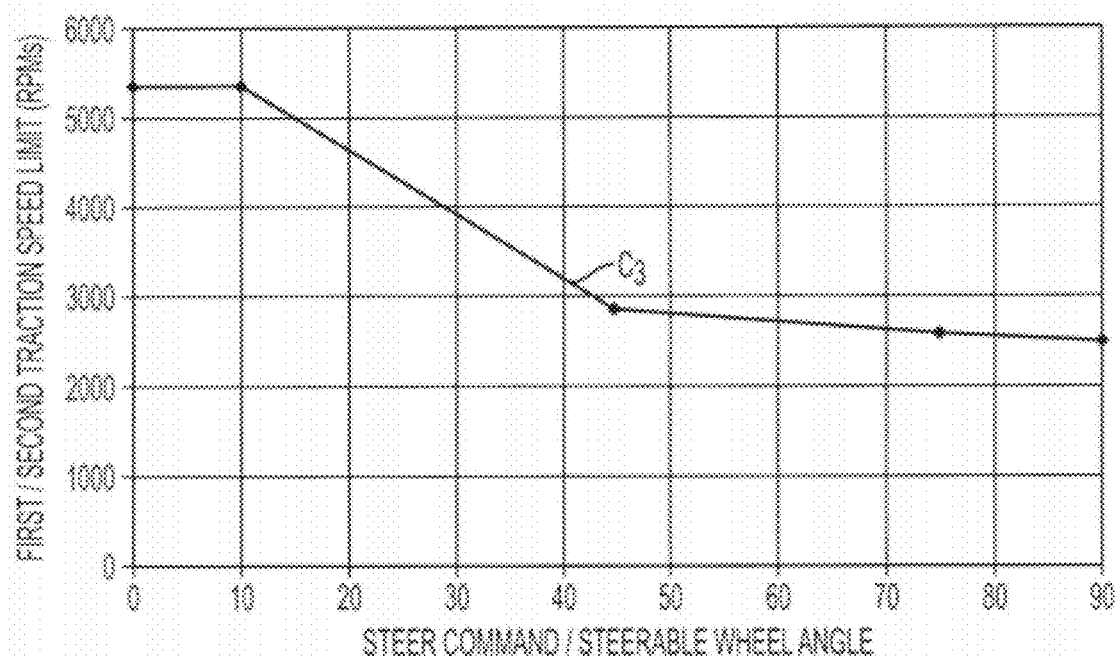
FIG. 11 illustrates a curve $C_3$ plotting a first traction motor speed limit or a second traction motor speed limit as a function of a desired steerable wheel angular position or a calculated actual steerable wheel angular position.

The control handle 90 further comprises a speed selection switch 98, see FIGS. 2, 7 and 8, which is capable of being toggled back and forth between a high speed position corresponding to a "high speed" mode and a low speed position corresponding to a "low speed" mode. Based on its position, the speed selection switch 98 generates a speed select signal to the traction control module 210. If the switch 98 is in its low speed position, the traction control module 210 may limit maximum speed of the vehicle 10 to about 3.5 MPH in both a forks first direction and a power unit first direction. If the switch 98 is in its high speed position, the traction control module 210 will allow, unless otherwise limited based on other vehicle conditions, see for example the discussion below regarding FIGS. 11, 11A and 11B, the vehicle to be operated up to a first maximum vehicle speed, e.g., 6.0 MPH, when the vehicle is being operated in a forks first direction and up to a second maximum vehicle speed, e.g., 9.0 MPH, when the vehicle is being operated in a power unit first direction. It is noted that when an operator is operating the vehicle 10 without standing on the floorboard 34, referred to as a "walkie" mode, discussed further below, the traction control module 210 will limit maximum speed of the vehicle to the maximum speed corresponding to the switch low speed position, e.g., about 3.5 MPH, even if the switch 98 is located in its high speed position. It is noted that the speed of the vehicle 10 within a speed range, e.g., 0-3.5 MPH, 0-6.0 MPH and 0-9.0 MPH, corresponding to one of the low speed mode/walkie mode, the high speed mode/first maximum vehicle speed, and the high speed mode/second maximum speed is proportional to the amount of rotation of a speed control element 96A, 96B being rotated.

The steer motor 120 comprises a position sensor 124, see FIG. 2. As the steer motor output shaft 123 and drive gear 122 rotate, the position sensor 124 generates a steer motor position signal to the steering control unit 220, which signal is indicative of an angular position of the steerable wheel 74 and the speed of rotation of the steerable wheel 74 about the first axis $A_1$. The steering control unit 220 calculates from the steer motor position signal a current actual angular position of the steerable wheel 74, and the current speed of rotation of the steerable wheel 74 about the first axis $A_1$. The steering control unit passes the calculated current angular position of the steerable wheel 74 and the current speed of rotation of the steerable wheel 74 to the display module 230.

The steering control unit 220 also receives the steer control signal from the control handle position sensor 100A, which, as noted above, senses the angular position of the control handle 90 within the angular range of approximately ±60 degrees in the illustrated embodiment. The steering control unit 220 passes the steer control signal to the display module 230. Since a current steer control signal corresponds to a current position of the control handle 90 falling within the range of from about ±60 degrees and the steerable wheel 74 is capable of rotating through an angular range of ±90 degrees, the display module 230 converts the current control handle position, as indicated by the steer control signal, to a corresponding desired angular position of the steerable wheel 74 by multiplying the current control handle position by a ratio of equal to or about 90/60 in the illustrated embodiment, e.g., an angular position of the control handle 90 of +60 degrees equals a desired angular position of the steerable wheel 74 of +90 degrees. The display module 230 further determines a steer rate, i.e., change in angular position of the control handle 90 per unit time, using the steer control signal. For example, the display module 230 may compare angular positions of the control handle 90 determined every 32 milliseconds to determine the steer rate.

As noted above, the proximity sensor 36 generates an operator status signal indicating that either an operator is standing on the floorboard 34 in the operator's compartment 30 or no operator is standing on the floorboard 34 in the operator's compartment 30. The proximity sensor 36 is coupled to the traction control module 210 such that the traction control module 210 receives the operator status signal from the proximity sensor 36. The traction control module 210 forwards the operator status signal to the display module 230. If an operator is standing on the floorboard 34 in the operator's compartment 30, as indicated by the operator status signal, the display module 230 will allow movement of the steerable wheel 74 to an angular position falling within a first angular range, which, in the illustrated embodiment, is equal to approximately ±90 degrees. If, however, an operator is NOT standing on the floorboard 34 in the operator's compartment 30, the display module 230 will limit movement of the steerable wheel 74 to an angular position within a second angular range, which, in the illustrated embodiment, is equal to approximately ±15 degrees. It is noted that when an operator is standing on the floorboard 34 in the operator's compartment 30, the vehicle is being operated in a rider mode, such as the high speed or the low speed mode noted above. When an operator is NOT standing on the floorboard 34 in the operator's compartment 30, the vehicle may be operated in the "walkie" mode, where the operator walks alongside the vehicle 10 while gripping and maneuvering the control handle 90 and one of the first and second rotatable speed control elements 96A and 96B. Hence, rotation of the steerable wheel 74 is limited during the walkie mode to an angular position within the second angular range.

Typically, an operator does not request that the control handle 90 be turned to an angular position greater than about ±45 degrees from the centered position when the vehicle 10 is operating in the walkie mode. If a request is made to rotate the control handle 90 to an angular position greater than about ±45 degrees and the vehicle 10 is being operated in the walkie mode, the display module 230 will command the traction control module 210 to cause the vehicle 10 to brake to a stop. If the display module 230 has caused the vehicle 10 to brake to a stop, the display module 230 will allow the traction motor 72 to rotate again to effect movement of the driven steerable wheel 74 after the control handle 90 has been moved to a position within a predefined range such as ±40 degrees and the first and second speed control elements 96A and 96B have been returned to their neutral/home positions.

As noted above, the steering control unit 220 passes the calculated current angular position of the steerable wheel 74 and the current speed of rotation of the steerable wheel 74 to the display module 230. The steering control unit 220 further passes the steer control signal to the display module 230, which module 230 converts the steer control signal to a corresponding requested or desired angular position of the steerable wheel 74. If an operator is standing on the floorboard 34 in the operator's compartment 30, as detected by the proximity sensor 36, the display module 230 forwards the requested angular position for the steerable wheel 74 to the steering control unit 220, which generates a first drive signal to the steer motor 120 causing the steer motor 120 to move the steerable wheel 74 to the requested angular position. If an operator is NOT standing on the floorboard 34 in the operator's compartment 30, as detected by the proximity sensor 36, the display module 230 will determine if the requested angular position for the steerable wheel 74 is within the second angular range, noted above. If so, the display module 230 forwards the requested angular position for the steerable wheel 74 to the steering control unit 220, which generates a first signal to the steer motor 120 causing the steer motor 120 to move the steerable wheel 74 to the requested angular position. If the requested angular position for the steerable wheel 74 is NOT within the second angular range, the display module 230 limits the angular position for the steerable wheel 74 forwarded to the steering control unit 220 to the appropriate extreme or outer limit of the second angular range.

As noted above, the encoder 172 is coupled to the output shaft of the traction motor 72 to generate signals indicative of the speed and direction of rotation of the traction motor 72. The encoder signals are provided to the traction control module 210 which determines the direction and speed of rotation of the traction motor 72 from those signals. The traction control module 210 then forwards traction motor rotation speed and direction information to the display module 230. This information corresponds to the direction and speed of rotation of the steerable wheel 74 about the second axis $A_2$.

Figure 10:
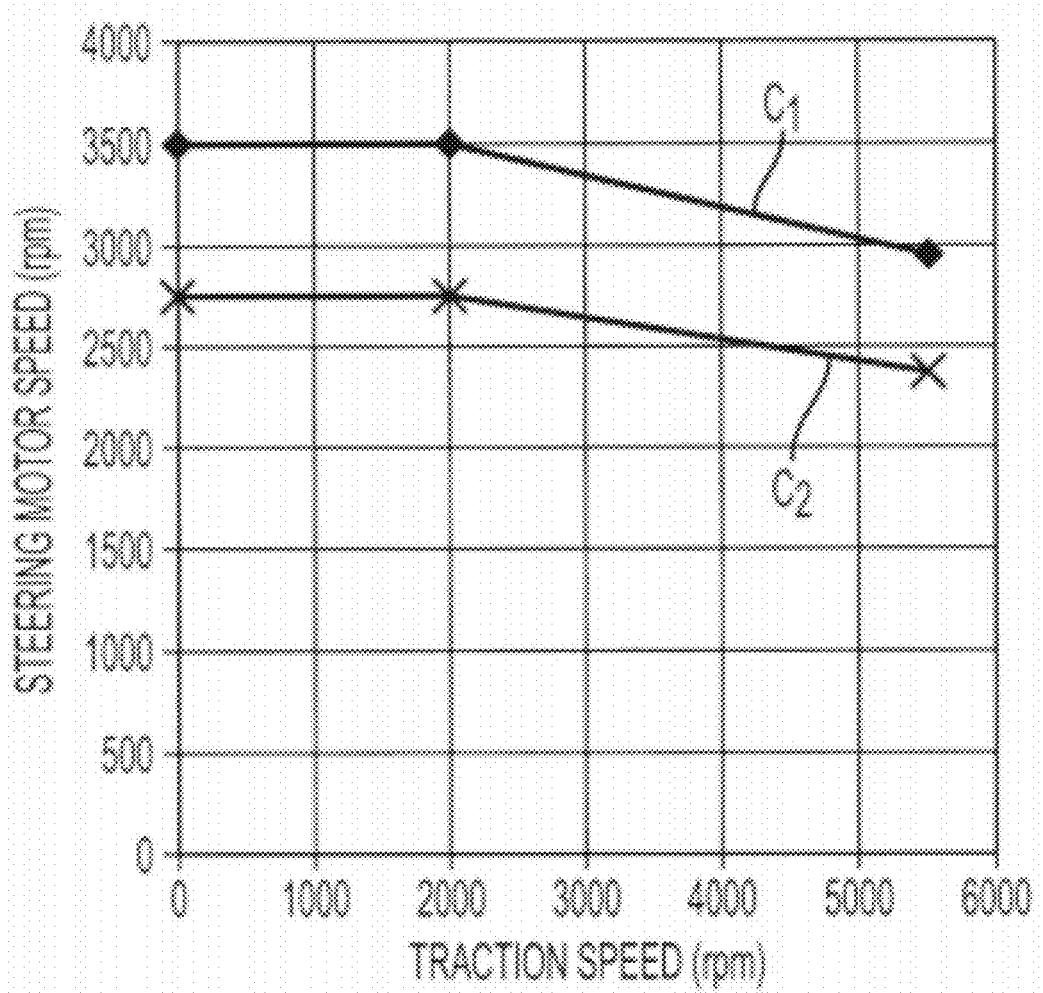
FIG. 10 illustrates a first curve $C_1$ used to define a steering motor speed limit based on a current traction motor speed when the vehicle is being operated in a power unit first direction and a second curve $C_2$ used to define a steering motor speed limit based on a current traction motor speed when the vehicle being operated in a forks first direction.

The display module 230 may define an upper steering motor speed limit based on a current traction motor speed using linear interpolation between points from a curve, which points may be stored in a lookup table. When the truck 10 is being operated in a power unit first direction, points from a curve, such as curve $C_1$ illustrated in FIG. 10, may be used to define a steering motor speed limit based on a current traction motor speed. When the truck 10 is being operated in a forks first direction, points from a curve, such as curve $C_2$ illustrated in FIG. 10, may be used to define a steering motor speed limit based on a current traction motor speed. In the illustrated embodiment, the steering motor speed upper limit decreases as the speed of the traction motor increases beyond about 2000 RPM, see curves $C_1$ and $C_2$ in FIG. 10. As a result, the steering motor responsiveness is purposefully slowed at higher speeds in order to prevent a "twitchy" or "overly sensitive" steering response as an operator operates the vehicle 10 at those higher speeds. Hence, the drivability of the vehicle 10 is improved at higher speeds. It is noted that the steering motor speed limits in curve $C_2$ for the forks first direction are lower than the steering motor speed limits in curve $C_1$ for the power unit first direction. An appropriate steering motor speed limit based on a current traction motor speed is provided by the display module 230 to the steering control module 210. The steering control module 210 uses the steering motor speed limit when generating the first drive signal to the steer motor 120 so as to maintain the speed of the steer motor 120 at a value equal to or less than the steering motor speed limit until the steerable wheel 74 has been moved to a desired angular position. Instead of storing points from curve $C_1$ or curve $C_2$, an equation or equations corresponding to each of the curves $C_1$ and $C_2$ may be stored and used by the display module 230 to determine a steering motor speed limit based on a current traction motor speed.

As noted above, the steering control unit 220 passes the steer control signal to the display module 230, which module 230 converts the steer control signal to a corresponding desired angular position of the steerable wheel 74. The steering control unit 220 also passes the calculated current actual angular position of the steerable wheel 74 to the display module 230. The display module 230 uses the desired angular position for the steerable wheel 74 to determine a first upper traction motor speed limit using, for example, linear interpolation between points from a curve, such as curve $C_3$, illustrated in FIG. 11, wherein the points may be stored in a lookup table. The display module 230 further uses the calculated actual angular position for the steerable wheel 74 to determine a second upper traction motor speed limit using, for example, linear interpolation between points from the curve $C_3$. Instead of storing points from a curve $C_3$, an equation or equations corresponding to the curve may be stored and used by the display module 230 to determine the first and second traction motor speed limits based on a desired angular position for the steerable wheel and a calculated current angular position of the steerable wheel. As is apparent from FIG. 11, the first/second traction motor speed limit decreases as the desired angular position/calculated angular position for the steerable wheel 74 increases so as to improve the stability of the vehicle 10 during high steerable wheel angle turns.

The display module 230 compares a current desired angular position of the steerable wheel 74 to a current calculated actual position of the steerable wheel 74 to determine a difference between the two equal to a steerable wheel error. Since the control handle position and the steerable wheel position are not locked to one another, steerable wheel error results from a delay between when an operator rotates the control handle 90 to effect a change in the position of the steerable wheel 74 and the time it takes the steer motor 120 to effect corresponding movement of the steerable wheel 74 to move the steerable wheel 74 to the new angular position.

Figure 11A:
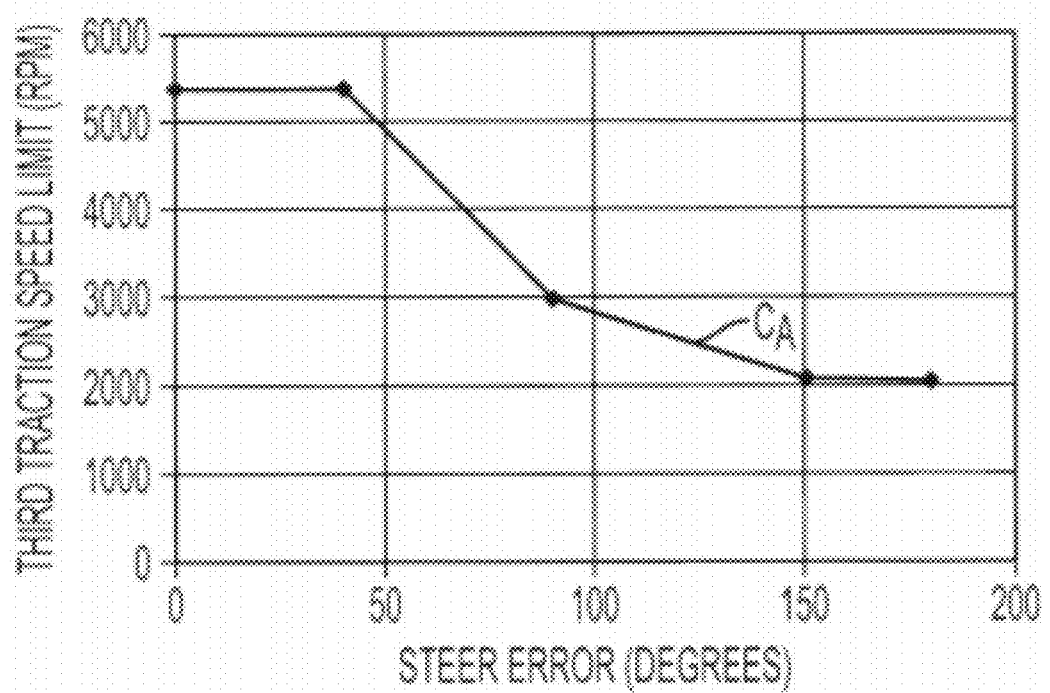
FIG. 11A illustrates a curve $C_A$ used to define a third traction motor speed limit based on steerable wheel error.

The display module 230 uses the steerable wheel error to determine a third upper traction motor speed limit using, for example, linear interpolation between points from a curve, such as curve $C_A$, illustrated in FIG. 11A, wherein the points may be stored in a lookup table. Instead of storing points from a curve, an equation or equations corresponding to the curve $C_A$ may be stored and used by the display module 230 to determine the third traction motor speed limit based on steerable wheel error. As is apparent from FIG. 11A, the third traction motor speed limit generally decreases as the steerable wheel error increases.

Figure 11B:
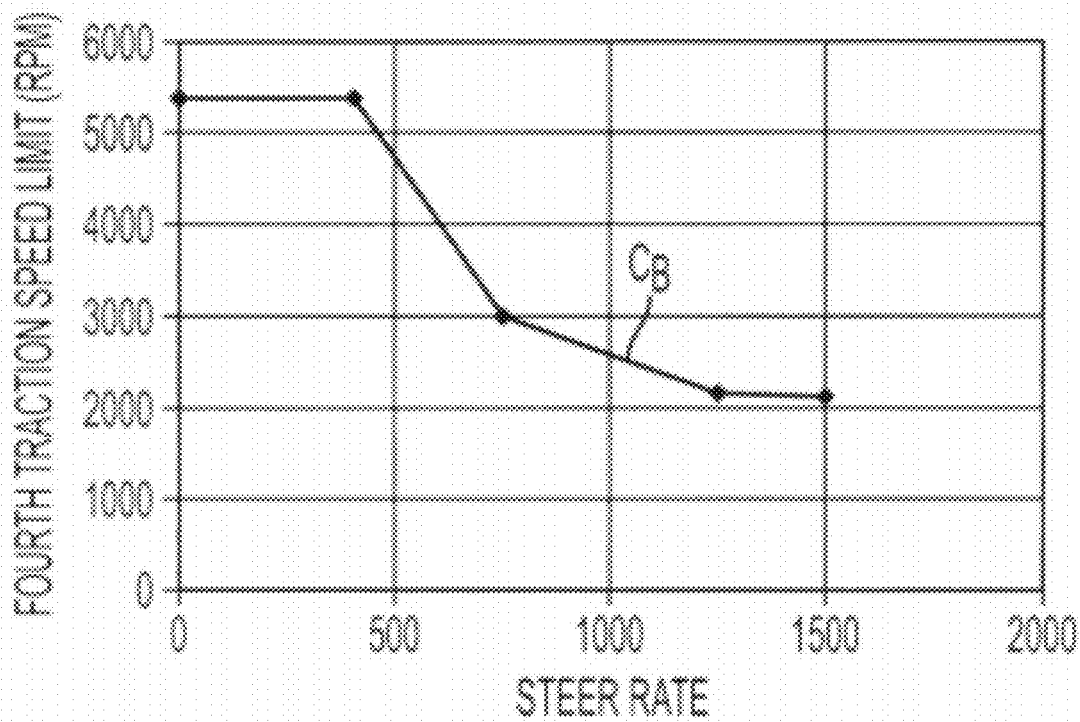
FIG. 11B illustrates a curve $C_B$ used to define a fourth traction motor speed limit based on steer rate.

The display module 230 uses the steer rate to determine a fourth upper traction motor speed limit using, for example, linear interpolation between points from a curve, such as curve $C_B$, illustrated in FIG. 11B, wherein the points may be stored in a lookup table. Instead of storing points from a curve, an equation or equations corresponding to the curve $C_B$ may be stored and used by the display module 230 to determine the fourth traction motor speed limit based on steer rate. As is apparent from FIG. 11B, the fourth traction motor speed limit generally decreases as the steer rate increases.

The display module 230 determines the lowest value from among the first, second, third and fourth traction motor speed limits and forwards the lowest speed limit to the traction control module 210 for use in controlling the speed of the traction motor 72 when generating a second drive signal to the traction motor 72.

The display module 230 may generate a high steerable wheel turn signal to the traction control module 210 when the steer control signal corresponds to a steerable wheel angular position greater than about ±7 degrees from its straight ahead position. When the display module 230 is generating a high steerable wheel turn signal, the vehicle is considered to be in a "special for turn" mode.

In the illustrated embodiment, the traction control module 210 stores a plurality of acceleration values for the traction motor 72. Each acceleration value defines a single, constant rate of acceleration for the traction motor 72 and corresponds to a separate vehicle mode of operation. For example, a single acceleration value may be stored by the traction control module 210 for each of the following vehicle modes of operation: low speed/walkie mode, forks first direction; low speed/walkie mode, power unit first direction; high speed mode, forks first direction; high speed mode, power unit first direction; special for turn mode, forks first direction; and special for turn mode, power unit first direction. The traction control module 210 selects the appropriate acceleration value based on a current vehicle mode of operation and uses that value when generating the second drive signal for the traction motor 72.

The display module 230 determines, in the illustrated embodiment, first, second and third acceleration reduction factors RF1, RF2 and RF3.

Figure 11C:
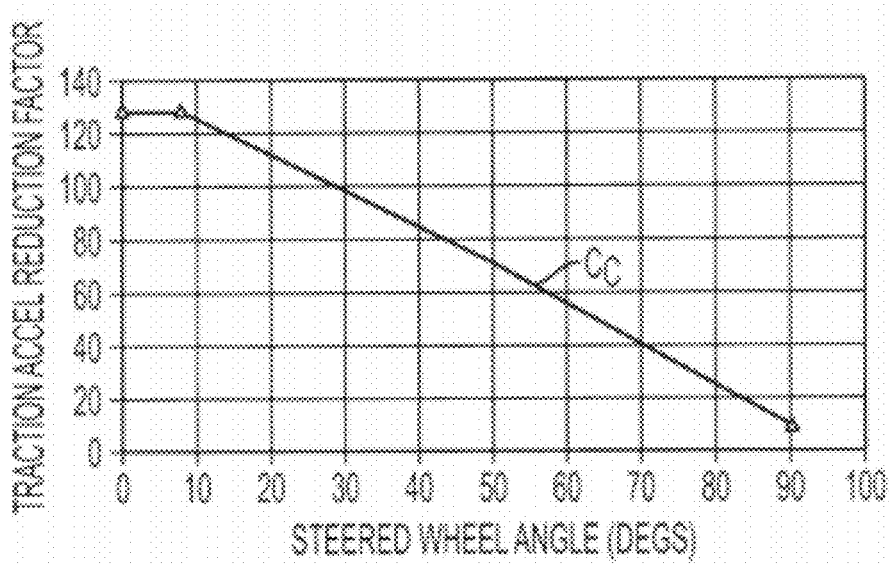
FIG. 11C illustrates a curve $C_C$ used to determine a first acceleration reduction factor RF1 based on a calculated current actual angular position of the steerable wheel.

As noted above, the steering control unit 220 passes the calculated current actual angular position of the steerable wheel 74 and the current speed of rotation of the steerable wheel 74 to the display module 230. The display module 230 may use the calculated current actual angular position of the steerable wheel 74 to determine the first acceleration reduction factor RF1 using, for example, linear interpolation between points from a curve, such as curve $C_C$, illustrated in FIG. 11C, wherein the points may be stored in a lookup table. Instead of storing points from a curve, an equation or equations corresponding to the curve $C_C$ may be stored and used by the display module 230 to determine the first acceleration reduction factor RF1. As is apparent from FIG. 11C, after a steered wheel angle of about 10 degrees, the first acceleration reduction factor RF1 decreases generally linear as the steerable wheel angle increases.

Figure 11D:
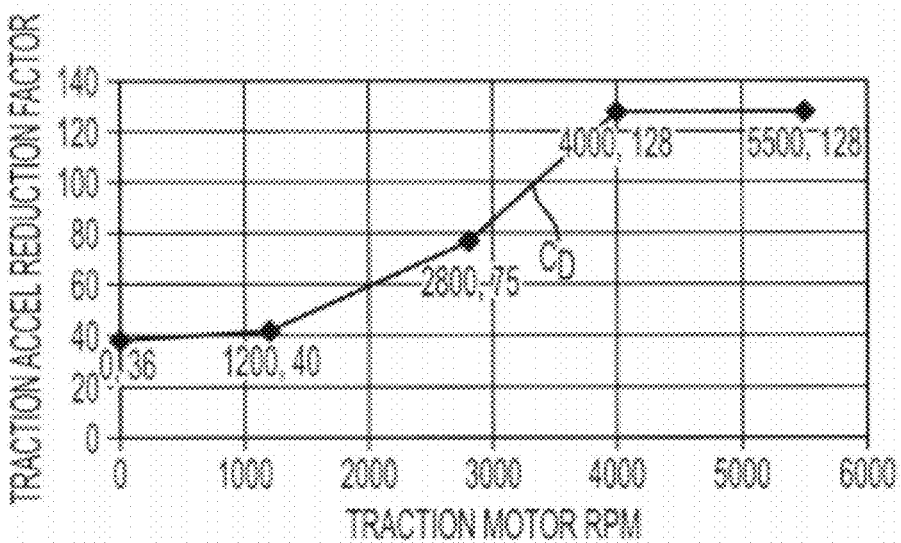
FIG. 11D illustrates a curve $C_D$ used to determine a second acceleration reduction factor RF2 based on a traction speed.

As discussed above, the traction control module 210 forwards traction motor rotation speed and direction information to the display module 230. The display module 230 may use the traction motor speed to determine the second acceleration reduction factor RF2 using, for example, linear interpolation between points from a curve, such as curve $C_D$, illustrated in FIG. 11D, wherein the points may be stored in a lookup table. Instead of storing points from a curve, an equation or equations corresponding to the curve $C_D$ may be stored and used by the display module 230 to determine the second acceleration reduction factor RF2. As is apparent from FIG. 11D, the second acceleration reduction factor RF2 generally increases as the traction motor speed increases.

As noted above, an operator may rotate one or both of the first and second speed control elements 96A, 96B causing the signal generator SG to generate a corresponding speed control signal to the traction control module 210. The traction control module 210 forwards the speed control signal to the display module 230. As also noted above, the speed control signal varies in magnitude based on the amount of rotation of the speed control elements 96A, 96B from their home positions. Hence, the speed control signal is indicative of the current position of the speed control elements 96A, 96B. The display module 230 may determined the third acceleration reduction factor RF3 using the speed control signal. For example, the third acceleration reduction factor RF3 may equal a first predefined value, e.g., 10, for all speed control signals corresponding to a position of each speed control element 96A, 96B between a zero or home position and a position corresponding to 80% of its maximum rotated position and may equal a second predefined value, e.g., 128, for all speed control signals corresponding to a position of each speed control element 96A, 96B greater than 80% of its maximum rotated position.

The display module 230 determines which of the first, second and third reduction factors RF1, RF2 and RF3 has the lowest value and provides that reduction factor to the traction control module 210. The traction control module 210 receives the selected reduction factor, which, in the illustrated embodiment, has a value between 0 and 128. The module 210 divides the reduction factor by 128 to determine a modified reduction factor. The modified reduction factor is multiplied by the selected acceleration value to determine an updated selected acceleration value, which is used by the traction control module 210 when generating the second drive signal to the traction motor 72. The reduction factor having the lowest value, prior to being divided by 128, effects the greatest reduction in the acceleration value.

Based on the position of the speed selection switch 98, the operator status signal, whether a high steerable wheel turn signal has been generated by the display module 230, the sign and magnitude of a speed control signal generated by the signal generator SG in response to operation of the first and second rotatable speed control elements 96A and 96B, an acceleration value corresponding to the current vehicle mode of operation, a selected acceleration reduction factor, a current traction motor speed and direction as detected by the encoder 172, and a selected traction motor speed limit, the traction control module 210 generates the second drive signal to the traction motor 72 so as to control the speed, acceleration and direction of rotation of the traction motor 72 and, hence, the speed, acceleration and direction of rotation of the steerable wheel 74 about the second axis $A_2$.

Instead of determining first, second and third reduction factors, selecting a lowest reduction factor, dividing the selected reduction factor by 128 and multiplying the modified reduction factor by a selected acceleration value to determine an updated selected acceleration value, the following steps may be implemented by the display module 230 either alone or in combination with the traction control module 210. Three separate curves are defined for each vehicle mode of operation, which modes of operation are listed above. The first curve defines a first acceleration value that varies based on the calculated current actual angular position of the steerable wheel 74. The second curve defines a second acceleration value that varies based on traction motor speed. The third curve defines a third acceleration value that varies based on the speed control signal from the signal generator SG. The display module and/or the traction control module determines using, for example, linear interpolation between points from each of the first, second and third curves corresponding to the current vehicle mode of operations, wherein the points may be stored in lookup tables, first, second and third acceleration values, selects the lowest acceleration value and uses that value when generating the second drive signal to the traction motor 72.

As noted above, the tactile feedback device 100 is capable of generating a resistance or counter force that opposes movement of the control handle 90, wherein the force varies based on the magnitude of the tactile feedback device signal. In the illustrated embodiment, the display module 230 defines a setpoint TFDS for the tactile feedback device signal, communicates the setpoint TFDS to the steering control module 220 and the steering control module 220 generates a corresponding tactile feedback device signal, e.g., a current measured for example in milliAmperes (mA), to the tactile feedback device 100.

Figure 12:
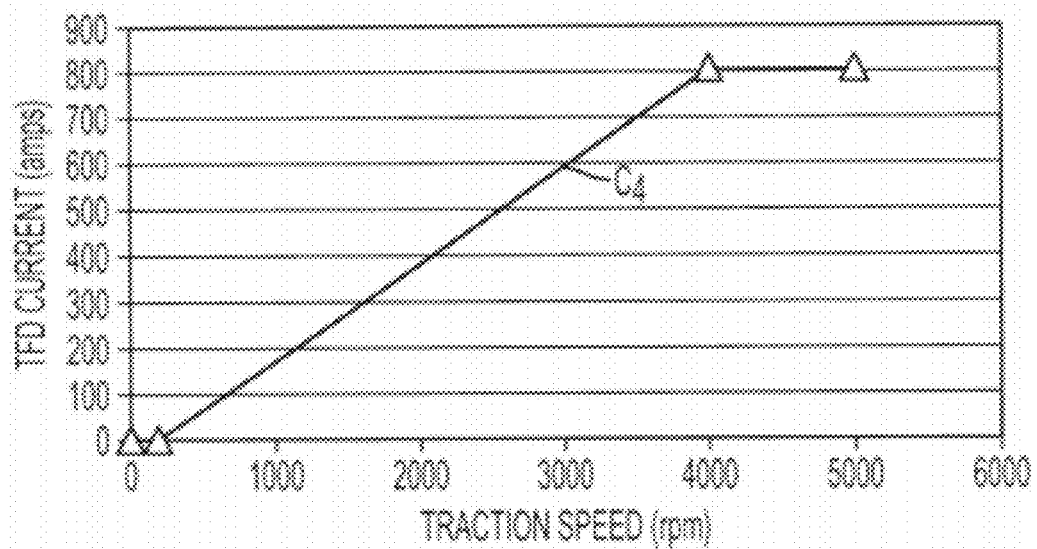
FIG. 12 illustrates a curve $C_4$ used to determine a first tactile feedback device signal value based on traction motor speed.

In the illustrated embodiment, the display module 230 defines the tactile feedback device signal setpoint TFDS as follows. The display module 230 constantly queries the traction control module 210 for speed and direction of rotation of the traction motor 72, which information is determined by the traction control module 210 from signals output by the encoder 172, as noted above. Based on the traction motor speed, the display module 230 determines a first tactile feedback device signal value TFD1, see step 302 in FIG. 14, using, for example, linear interpolation between points from a curve, such as curve $C_4$, illustrated in FIG. 12, wherein the points may be stored in a lookup table. Instead of storing points from a curve, an equation or equations corresponding to the curve $C_4$ may be stored and used by the display module 230 to determine the first value TFD1. As can be seen from FIG. 12, the first value TFD1 generally increases with traction motor speed.

Figure 13:
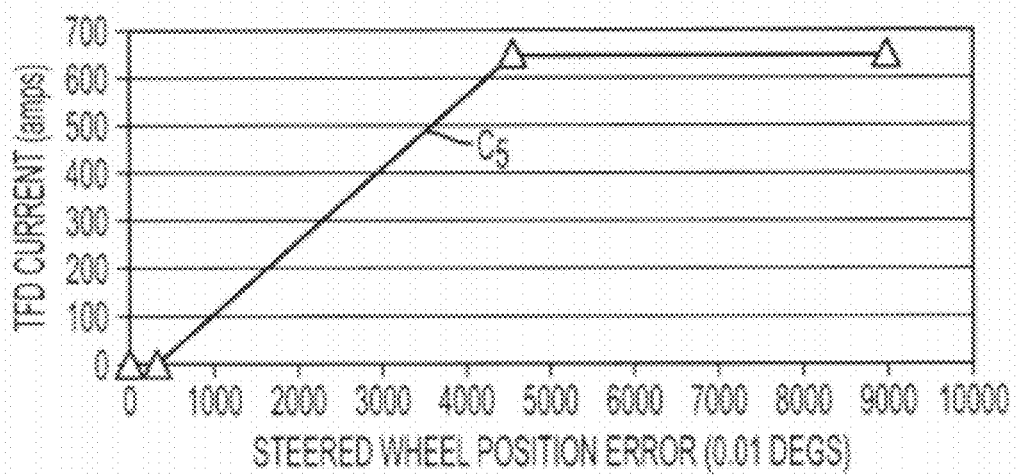
FIG. 13 illustrates a curve $C_5$ used to determine a second tactile feedback device signal value based on steerable wheel error.

As noted above, the display module 230 compares the current desired angular position of the steerable wheel 74 to a current calculated actual position of the steerable wheel 74 to determine a difference between the two equal to a steerable wheel error. Based on the steerable wheel error, the display module 230 determines a second tactile feedback device signal value TFD2, see step 302 in FIG. 14, using, for example, linear interpolation between points from a curve, such as curve $C_5$, illustrated in FIG. 13, wherein the points may be stored in a lookup table. Instead of storing points from a curve, an equation or equations corresponding to the curve $C_5$ may be stored and used by the display module 230 to determine the second value TFD2. As can be seen from FIG. 13, the second value TFD2 generally increases with steerable wheel error.

Figure 14:
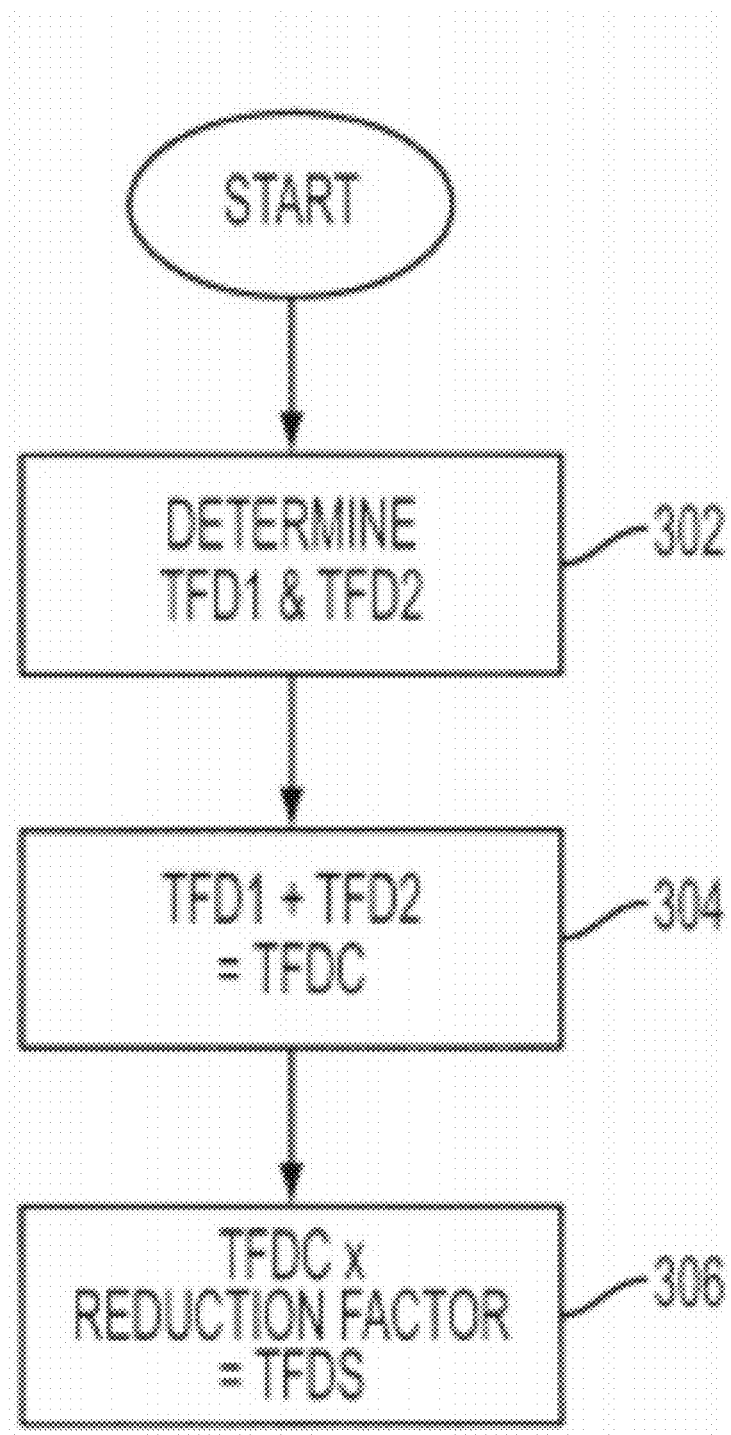
FIG. 14 illustrates in block diagram form steps for determining a tactile feedback device signal setpoint TFDS.

In the illustrated embodiment, the display module 230 sums the first and second values TFD1 and TFD2 together to determine a combined tactile feedback device signal value TFDC, see step 304 in FIG. 14, and multiplies this value by a reduction factor based on a direction in which the vehicle 10 is moving in order to determine the tactile feedback device signal setpoint TFDS, see step 306 in FIG. 14. If the vehicle 10 is being driven in a forks first direction, the reduction factor may equal 0.5. If the vehicle 10 is being driven in a power unit first direction, the reduction factor may equal 1.0. Generally, an operator has only one hand on the control handle 90 when the vehicle 10 is moving in the forks first direction. Hence, the reduction factor of 0.5 makes it easier for the operator to rotate the control handle 90 when the vehicle 10 is traveling in the forks first direction.

The display module 230 provides the tactile feedback device signal setpoint TFDS to the steering control unit 220, which uses the setpoint TFDS to determine a corresponding tactile feedback device signal for the tactile feedback device 100. Because the tactile feedback device signal is determined in the illustrated embodiment from the first and second values TFD1 and TFD2, which values come from curves $C_4$ and $C_5$ in FIGS. 12 and 13, the tactile feedback device signal increases in magnitude as the traction motor speed and steerable wheel error increase. Hence, as the traction motor speed increases and the steerable wheel error increases, the counter force generated by the tactile feedback device 100 and applied to the control handle 90 increases, thus, making it more difficult for an operator to turn the control handle 90. It is believed to be advantageous to increase the counter force generated by the tactile feedback device 100 as the traction motor speed increases to reduce the likelihood that unintended motion will be imparted to the control handle 90 by an operator as the vehicle 10 travels over bumps or into holes/low spots found in a floor upon which it is driven and enhance operator stability during operation of the vehicle. It is further believed to be advantageous to increase the counter force generated by the tactile feedback device 100 as the steerable wheel error increases so as to provide tactile feedback to the operator related to the magnitude of the steerable wheel error.

In a further embodiment, a pressure transducer 400, shown in dotted line in FIG. 2, is provided as part of a hydraulic system (not shown) coupled to the forks 60A and 60B for elevating the forks 60A and 60B. The pressure transducer 400 generates a signal indicative of the weight of any load on the forks 60A and 60B to the display module 230. Based on the fork load, the display module 230 may determine a third tactile feedback device signal value TFD3 using, for example, linear interpolation between points from a curve (not shown), where the value TFD3 may vary linearly with fork load such that the value TFD3 may increase as the weight on the forks 60A and 60B increases. The display module 230 may sum the first, second and third values TFD1, TFD2 and TFD3 together to determine a combined tactile feedback device signal value TFDC, which may be multiplied by a reduction factor, noted above, based on a direction in which the vehicle 10 is moving in order to determine a tactile feedback device signal setpoint TFDS. The display module 230 provides the tactile feedback device signal setpoint TFDS to the steering control unit 220, which uses the setpoint TFDS to determine a corresponding tactile feedback device signal for the tactile feedback device 100.

As discussed above, the proximity sensor 36 outputs an operator status signal to the traction control module 210, wherein a change in the operator status signal indicates that an operator has either stepped onto or stepped off of the floorboard 34 in the operator's compartment 30. As also noted above, the traction control module 210 provides the operator status signal to the display module 230. The display module 230 monitors the operator status signal and determines whether an operator status signal change corresponds to an operator stepping onto or stepping off of the floorboard 34. An operator stops the vehicle before stepping out of the operator's compartment. When the operator leaves the operator's compartment, if the tactile feedback device signal is at a force generating value, e.g., a non-zero value in the illustrated embodiment, causing the tactile feedback device 100 to generate a counter force to the control handle 90, the display module 230 decreases the tactile feedback device signal setpoint TFDS at a controlled rate, e.g., 900 mA/second, until the tactile feedback device signal setpoint TFDS, and, hence, the tactile feedback device signal, equal zero. By slowly decreasing the tactile feedback device signal setpoint TFDS and, hence, the tactile feedback device signal, at a controlled rate and presuming the control handle 90 is positioned away from its centered position, the biasing structure 110 is permitted to return the control handle 90 back to its centered position, i.e., 0 degrees, without substantially overshooting the centered position after the operator has stepped off the floorboard 34. The tactile feedback device signal setpoint TFDS, and, hence, the tactile feedback device signal, are maintained at a zero value for a predefined period of time, e.g., two seconds. Thereafter, the display module 230 determines an updated tactile feedback device signal setpoint TFDS and provides the updated tactile feedback device signal setpoint TFDS to the steering control unit 220. It is contemplated that the display module 230 may only decrease the tactile feedback device signal setpoint TFDS if, in addition to an operator leaving the operator's compartment and the tactile feedback device signal being at a force generating value, the control handle 90 is positioned away from its centered position. It is further contemplated that the display module 230 may maintain the tactile feedback device signal setpoint TFDS at a zero value until it determines that the control handle 90 has returned to its centered position.

If, while monitoring the operator status signal, the display module 230 determines that an operator status signal change corresponds to an operator stepping onto the floorboard 34, the display module 230 will immediately increase the tactile feedback device signal setpoint TFDS for a predefined period of time, e.g., two seconds, causing a corresponding increase in the tactile feedback device signal. The increase in the tactile feedback signal is sufficient such that the tactile feedback device 100 generates a counter force of sufficient magnitude to the control handle 90 to inhibit an operator from making a quick turn request via the control handle 90 just after the operator has stepping into the operator's compartment 30. After the predefined time period has expired, the display module 230 determines an updated tactile feedback device signal setpoint TFDS and provides the updated tactile feedback device signal setpoint TFDS to the steering control unit 220.

Also in response to determining that an operator has just stepped onto the floorboard 34 and if a steer request is immediately made by an operator via the control handle 90, the display module 230 provides an instruction to the steering control module 220 to operate the steer motor 120 at a first low speed, e.g., 500 RPM and, thereafter, ramp up the steer motor speed, e.g., linearly, to a second higher speed over a predefined period of time, e.g., one second. The second speed is defined by curve $C_1$ or curve $C_2$ in FIG. 10 based on a current traction motor speed. Hence, the first drive signal to the steer motor 120 is varied such that the speed of the steer motor 120, i.e., the rate of speed increase, gradually increases from a low value after the operator enters the operator's compartment in order to avoid a sudden sharp turn maneuver.

It is further contemplated that the steerable wheel may not be driven. Instead, a different wheel forming part of the vehicle would be driven by the traction motor 72. In such an embodiment, the traction control module 210 may generate a second drive signal to the traction motor 72 so as to control the speed, acceleration and direction of rotation of the traction motor 72 and, hence, the speed, acceleration and direction of rotation of the driven wheel based on the position of the speed selection switch 98, the operator status signal, whether a high steerable wheel turn signal has been generated by the display module 230, the sign and magnitude of a speed control signal generated by the signal generator SG in response to operation of the first and second rotatable speed control elements 96A and 96B, an acceleration value corresponding to the current vehicle mode of operation, a selected acceleration reduction factor, a current traction motor speed and direction as detected by the encoder 172, and a selected traction motor speed limit.

It is still further contemplated that a vehicle including a mechanical or hydrostatic steering system may include a traction motor 72 controlled via a traction control module 210 and a display module 230 as set out herein presuming the vehicle includes a control handle position sensor or like sensor for generating signals indicative of an angular position of the control handle and its steer rate and a position sensor or like sensor for generating signals indicative of an angular position of a steerable wheel and a speed of rotation of the steerable wheel about an axis $A_1$.

In accordance with a further embodiment of the present invention, the display module 230 may be modified so as to operate in the following manner.

Figure 15:
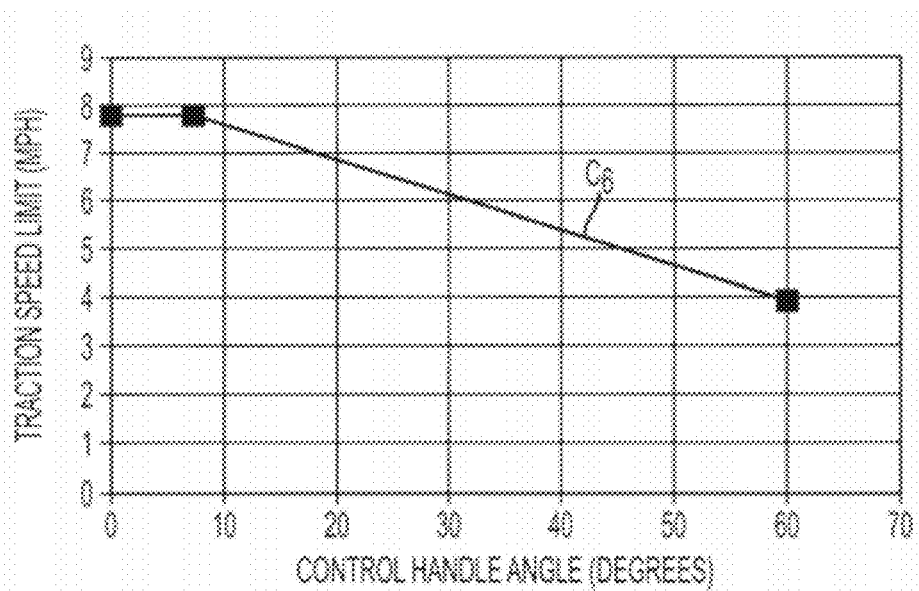
FIG. 15 illustrates a curve $C_6$ plotting a first traction motor speed limit as a function of a control handle angle.

As noted above, the steering control module 220 passes the steer control signal to the display module 230. The steer control signal corresponds to the angular position of the control handle 90. The display module 230 uses the control handle angular position, as defined by the steer control signal, to determine a first upper traction motor speed limit using, for example, a curve, such as curve $C_6$, illustrated in FIG. 15, wherein points from the curve $C_6$ may be stored in a lookup table. A traction speed limit that does not directly correspond to a point in the table can be determined by linear interpolation or other appropriate estimator. Instead of storing points from a curve $C_6$, an equation or equations corresponding to the curve may be stored and used by the display module 230 to determine the first traction motor speed limit based on an angular position of the control handle 90. As is apparent from FIG. 15, the first traction motor speed limit decreases as the angular position of the control handle 90 increases so as to improve the stability of the vehicle 10 during high steerable wheel angle turns.

As noted above, the display module 230 converts the steer control signal to a corresponding desired angular position of the steerable wheel 74. The steering control module 220 also passes the calculated current actual angular position of the steerable wheel 74 to the display module 230. The display module 230 compares a current desired angular position of the steerable wheel 74 to a current calculated actual position of the steerable wheel 74 to determine a difference between the two equal to a steerable wheel error. Since the control handle position and the steerable wheel position are not locked to one another, steerable wheel error results from a delay between when an operator rotates the control handle 90 to effect a change in the position of the steerable wheel 74 and the time it takes the steer motor 120 to move the steerable wheel 74 to the new angular position.

Figure 16:
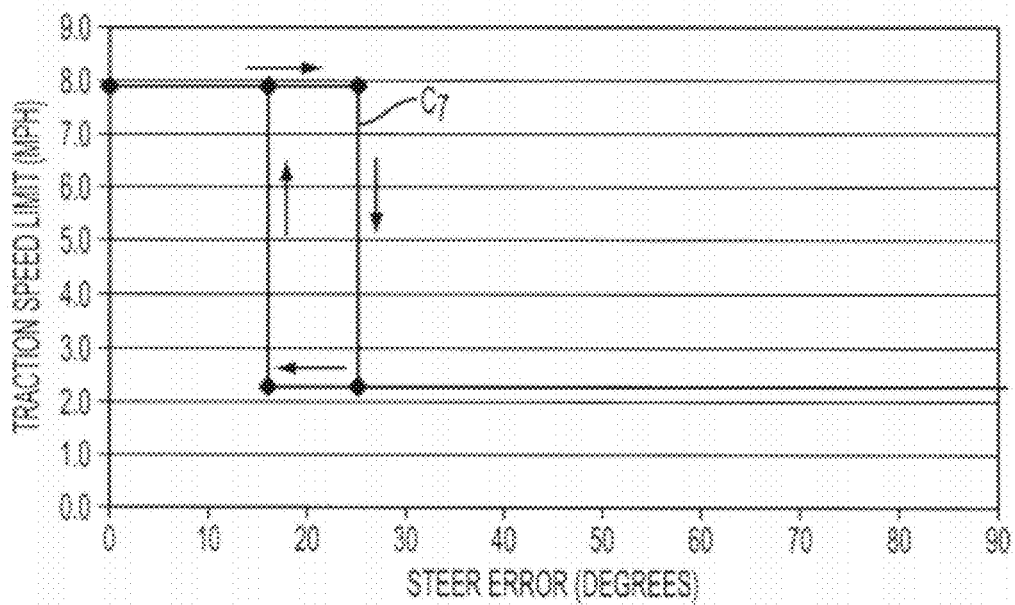
FIG. 16 illustrates a curve $C_7$ used to define a second traction motor speed limit based on steerable wheel error.

The display module 230 uses the steerable wheel error to determine a second upper traction motor speed limit using, for example, a curve, such as curve $C_7$, illustrated in FIG. 16, wherein points from the curve $C_7$ may be stored in a lookup table. A traction speed limit that does not directly correspond to a point in the table can be determined by linear interpolation or other appropriate estimator. Instead of storing points from a curve, an equation or equations corresponding to the curve $C_7$ may be stored and used by the display module 230 to determine the second traction motor speed limit based on steerable wheel error. As is apparent from FIG. 16, the second traction motor speed limit decreases in a step-wise manner from a maximum speed, 7.8 MPH in the illustrated embodiment, to a creep speed, 2.3 MPH in the illustrated embodiment, when the steerable wheel error is equal to or greater than a first threshold value, e.g., 25 degrees, so as to give an operator an indication that steerable wheel error is excessive and quick movements of the control handle 90 should be reduced or stopped. The second traction motor speed limit returns to the maximum speed when the steerable wheel error is equal to or less than a second threshold value, e.g., 16 degrees, see FIG. 16, providing hysteresis to prevent potential oscillation between the two speed limits.

The display module 230 determines the lowest value between the first and second traction motor speed limits and forwards the lowest speed limit to the traction control module 210 for use in controlling the speed of the traction motor 72 when generating a second drive signal to the traction motor 72.

As noted above, the tactile feedback device 100 is capable of generating a resistance or counter force that opposes movement of the control handle 90, wherein the force varies based on the magnitude of the tactile feedback device signal. In the illustrated embodiment, the display module 230 defines a setpoint TFDS for the tactile feedback device signal, communicates the setpoint TFDS to the steering control module 220 and the steering control module 220 generates a corresponding tactile feedback device signal, e.g., a current measured for example in milliAmperes (mA), to the tactile feedback device 100.

Figure 17:
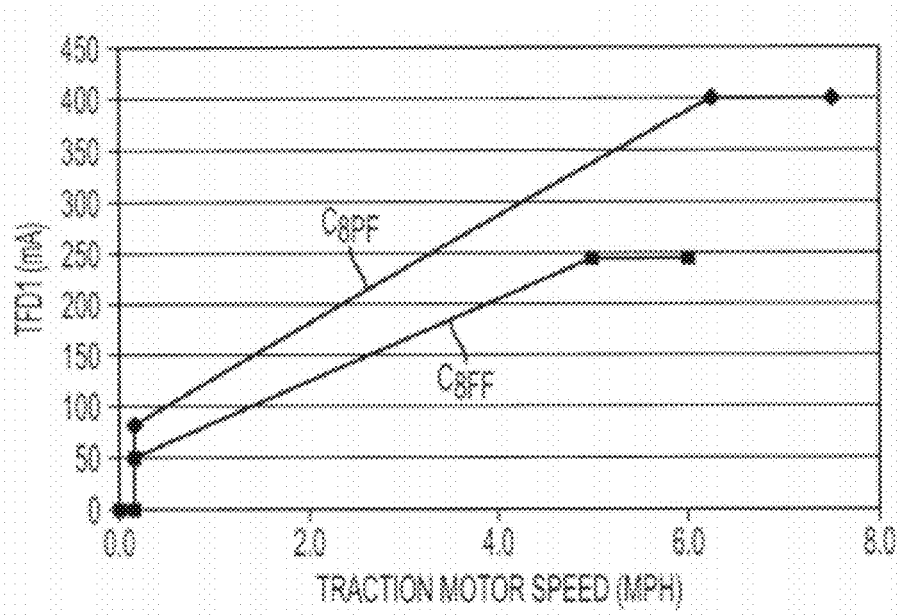
FIG. 17 illustrates curves $C_{8PF}$ and $C_{8FF}$ used to determine a first tactile feedback device signal value based on traction motor speed.

In the illustrated embodiment, the display module 230 defines the tactile feedback device signal setpoint TFDS as follows. The display module 230 constantly queries the traction control module 210 for speed and direction of rotation of the traction motor 72, which information is determined by the traction control module 210 from signals output by the encoder 172, as noted above. Based on the traction motor speed, the display module 230 determines a first tactile feedback device signal value TFD1, using, for example, a curve, such as a power unit first curve $C_{8PF}$, which curve is used when the power unit 50 is driven first, or a forks first curve $C_{8FF}$, which curve is used when the truck 10 is driven in a forks first direction, see FIG. 17, wherein points from the curves $C_{8PF}$ and $C_{8FF}$ may be stored in one or more lookup tables. A signal value for TFD1 that does not directly correspond to a point in a table can be determined by linear interpolation or other appropriate estimator. Instead of storing points from one or more curves, an equation or equations corresponding to the curves $C_{8PF}$ and $C_{8FF}$ may be stored and used by the display module 230 to determine the first value TFD1. As can be seen from FIG. 17, the first value TFD1 generally increases with traction motor speed in both the power unit first curve $C_{8PF}$ and the forks first curve $C_{8FF}$.

Figure 18:
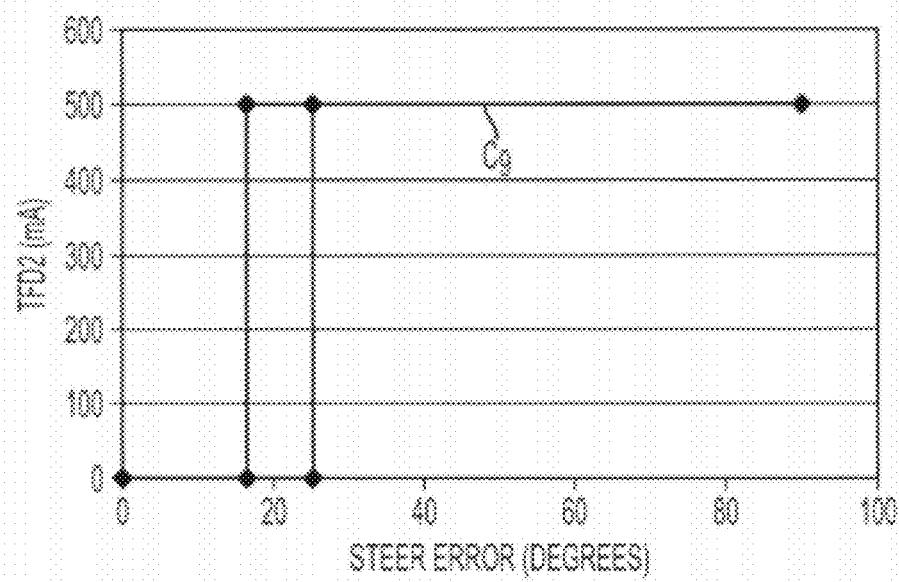
FIG. 18 illustrates a curve $C_9$ used to determine a second tactile feedback device signal value based on steerable wheel error.

As noted above, the display module 230 compares the current desired angular position of the steerable wheel 74 to a current calculated actual position of the steerable wheel 74 to determine a difference between the two equal to a steerable wheel error. Based on the steerable wheel error, the display module 230 determines a second tactile feedback device signal value TFD2 using, for example, a curve, such as curve $C_9$, illustrated in FIG. 18, wherein points from the curve $C_9$ may be stored in a lookup table. A signal value for TFD2 that does not directly correspond to a point in a table can be determined by linear interpolation or other appropriate estimator. Instead of storing points from a curve, an equation or equations corresponding to the curve $C_9$ may be stored and used by the display module 230 to determine the second value TFD2. As can be seen from FIG. 18, the second value TFD2 increases in a step-wise manner from a low value, e.g., 0 mA, to a high value, e.g., 500 mA, when with steerable wheel error is equal to or greater than a first threshold value, e.g., 25 degrees. The second value TFD2 returns to the low value, e.g., 0 mA, when the steerable wheel error is equal to or less than a second threshold value, e.g., 16 degrees.

In the illustrated embodiment, the display module 230 sums the first and second values TFD1 and TFD2 together to determine a combined tactile feedback device signal value TFDC and multiplies this value by a reduction factor based on a direction in which the vehicle 10 is moving in order to determine the tactile feedback device signal setpoint TFDS. If the vehicle 10 is being driven in the forks first direction, the reduction factor may equal 0.5. If the vehicle 10 is being driven in the power unit first direction, the reduction factor may equal 1.0. Generally, an operator has only one hand on the control handle 90 with the other hand positioned on the backrest 32 when the vehicle 10 is moving in the forks first direction. Hence, the reduction factor of 0.5 makes it easier for the operator to rotate the control handle 90 when the vehicle 10 is traveling in the forks first direction. It is contemplated that the tactile feedback device signal value TFDC may be based solely on the second value TFD2.

The display module 230 provides the tactile feedback device signal setpoint TFDS to the steering control module 220, which uses the setpoint TFDS to determine a corresponding tactile feedback device signal for the tactile feedback device 100. Because the tactile feedback device signal is determined in the illustrated embodiment from the first and second values TFD1 and TFD2, which values come from curves $C_{8PF}$ or $C_{8FF}$ and $C_9$ in FIGS. 17 and 18, the tactile feedback device signal increases in magnitude as the traction motor speed and steerable wheel error increase. Hence, as the traction motor speed increases and the steerable wheel error increases, the counter force generated by the tactile feedback device 100 and applied to the control handle 90 increases, thus, making it more difficult for an operator to turn the control handle 90. It is believed to be advantageous to increase the counter force generated by the tactile feedback device 100 as the traction motor speed increases to reduce the likelihood that unintended motion will be imparted to the control handle 90 by an operator as the vehicle 10 travels over bumps or into holes/low spots found in a floor upon which it is driven and enhance operator stability during operation of the vehicle. It is further believed to be advantageous to quickly and significantly increase the counter force generated by the tactile feedback device 100 when the steerable wheel error increases beyond a first threshold value so as to provide tactile feedback to the operator when the steerable wheel error is equal to or greater than the first threshold value.

In accordance with a further embodiment of the present invention, the display module 230 may be modified so as to operate in the following manner.

As noted above, the control handle position sensor 100A, shown in FIG. 2 but not shown in FIG. 9, senses the angular position of the control handle 90 within the angular range of approximately ±60 degrees in the illustrated embodiment. As also noted above, as the control handle 90 is rotated by the operator, the control handle position sensor 100A senses that rotation, i.e., magnitude and direction, and generates a steer control signal to the steering control module 220. The steering control unit 220 passes the steer control signal to the display module 230.

As further noted above, the steer motor position sensor 124 generates a signal to the steering control unit 220, which signal is indicative of an angular position of the steerable wheel 74 and the speed of rotation of the steerable wheel 74 about the first axis $A_1$. The steering control unit 220 calculates from the steer motor position signal a current actual angular position of the steerable wheel 74, and the current speed of rotation of the steerable wheel 74 about the first axis $A_1$ and passes that information to the display module 230. As discussed above, the steerable wheel 74 is capable of rotating approximately ±90 degrees from a centered position in the illustrated embodiment.

As still further noted above, the control handle 90 comprises a speed selection switch 98, see FIGS. 2, 7 and 8, which is capable of being toggled back and forth between a high speed position corresponding to a "high speed" mode and a low speed position corresponding to a "low speed" mode. Based on its position, the speed selection switch 98 generates either a high speed select signal or low speed select signal to the traction control module 210. The traction control module 210 provides the speed select signal to the display module 230. If the switch 98 is in its low speed position, the traction control module 210 may limit maximum speed of the vehicle 10 to about 3.5 MPH in both a forks first direction and a power unit first direction. If the switch 98 is in its high speed position, the traction control module 210 will allow, unless otherwise limited based on other vehicle conditions, see for example the discussion above regarding FIGS. 11, 11A and 11B, the vehicle to be operated up to a first maximum vehicle speed, e.g., 6.0 MPH, when the vehicle is being operated in a forks first direction and up to a second maximum vehicle speed, e.g., 9.0 MPH, when the vehicle is being operated in a power unit first direction.

In this embodiment, the display module 230 converts the current control handle position, as indicated by the steer control signal, to a corresponding desired angular position of the steerable wheel 74 using a steerable-wheel-to-control-handle-position ratio, which ratio is determined based on the position of the speed selection switch 98.

As discussed above, if an operator is standing on the floorboard 34 in the operator's compartment 30, as detected by the proximity sensor 36, the display module 230 forwards the desired angular position for the steerable wheel 74 to the steering control unit 220, which generates a first drive signal to the steer motor 120 causing the steer motor 120 to move the steerable wheel 74 to the requested angular position. If an operator is NOT standing on the floorboard 34 in the operator's compartment 30, as detected by the proximity sensor 36, the display module 230 will determine if the requested angular position for the steerable wheel 74 is within the second angular range, noted above. If so, the display module 230 forwards the requested angular position for the steerable wheel 74 to the steering control unit 220, which generates a first signal to the steer motor 120 causing the steer motor 120 to move the steerable wheel 74 to the requested angular position. If the requested angular position for the steerable wheel 74 is NOT within the second angular range, the display module 230 limits the angular position for the steerable wheel 74 forwarded to the steering control unit 220 to the appropriate extreme or outer limit of the second angular range.

When the speed selection switch 98 is located in the "low speed" mode, the display module 230 multiplies the current control handle position by a ratio equal to 90/60 or 1.5/1.0 in the illustrated embodiment to determine the desired angular position of the steerable wheel 74. For example, if the angular position of the control handle 90 is +60 degrees, the display module 230 multiplies +60 degrees by the ratio of 1.5/1.0 to determine a desired angular position of the steerable wheel 74 equal to +90 degrees. When in the low speed mode, steering is believed to be enhanced when the ratio is equal to 1.5/1.0 because the truck is more maneuverable.

When the speed selection switch 98 is located in the "high speed" mode, the display module 230 multiplies the current control handle position by a ratio equal to 60/60 or 1.0/1.0 in the illustrated embodiment to determine the desired angular position of the steerable wheel 74. For example, if the angular position of the control handle 90 is +60 degrees, the display module 230 multiplies +60 degrees by the ratio of 1.0/1.0 to determine a desired angular position of the steerable wheel 74 equal to +60 degrees. When in the high speed mode and the ratio is equal to 1.0/1.0, the control handle 90 always points in the same direction as the desired angular position of the steerable wheel and the operator is provided with more steering resolution.

An operator may toggle the speed selection switch 98 while the vehicle is moving. In a first embodiment, however, the display module 230 will not change the steerable-wheel-to-control-handle-position ratio from 1.5/1.0 to 1.0/1.0 or from 1.0/1.0 to 1.5/1.0 while the truck 10 is moving. That is, the truck 10 must come to a complete stop before the display module 230 makes a change in the steerable-wheel-to-control-handle-position ratio in response to the switch 98 being toggled, i.e., changed, during truck movement. It is desirable for the truck 10 to come to a complete stop to avoid a rapid change in steerable wheel position if the truck is being steered in a direction away from a straight ahead direction. Such a change in steerable wheel position may occur without any change in the angular position of the control handle 90.

As also noted above, the display module 230 compares a current desired angular position of the steerable wheel 74 to a current calculated actual position of the steerable wheel 74 to determine a difference between the two equal to a steerable wheel error.

In accordance with a further embodiment of the present invention, the display module 230 changes the steerable-wheel-to-control-handle-position ratio from 1.5/1.0 to 1.0/1.0 or from 1.0/1.0 to 1.5/1.0 while the truck 10 is moving in response to the switch 98 being changed if the following conditions are met: the control handle 90 is located in a position within the range of ±3 degrees of its centered or straight ahead position as sensed by the control handle position sensor 100A; the steerable wheel 74 is located within the range of ±3 degrees of its centered or straight ahead position as calculated by the steering control unit 220 from the steer motor position sensor signal; and the magnitude of the steerable wheel error is equal to 3 degrees or less. It is contemplated that the control handle position range may comprise a range less than or slightly greater than ±3 degrees of its centered position; the steerable wheel position range may comprise a range less than or slightly greater than ±3 degrees of its centered position; and the magnitude of the steerable wheel error may fall within a range less than or slightly greater than a range of between 0 and 3 degrees. If the truck 10 is being steered beyond the control handle and steerable wheel position ranges, it is preferred for the truck 10 to come to a complete stop in response to the speed selection switch 98 being toggled during truck movement. Since the steerable-wheel-to-control-handle-position ratio changes in a stepped fashion in the illustrated embodiment, this will prevent rapid changes in the steerable wheel position if the truck 10 is being operated through a turn while moving and the switch 98 is toggled.

In a still further embodiment of the present invention, the display module 230 determines the steerable-wheel-to-control-handle-position ratio based on a position of a maneuverability switch (not shown) instead of the position of the speed selection switch 98.

When the maneuverability switch is located in a "low resolution" position, the display module 230 multiplies the current control handle position by a ratio equal to 90/60 or 1.5/1.0 in the illustrated embodiment to determine the desired angular position of the steerable wheel 74. When in the low resolution mode and the vehicle is operating at a low speed, steering is believed to be enhanced because the truck is more maneuverable. When the maneuverability switch is located in the "high resolution" position, the display module 230 multiplies the current control handle position by a ratio equal to 60/60 or 1.0/1.0 in the illustrated embodiment to determine the desired angular position of the steerable wheel 74. When in the high resolution mode and the vehicle is operating at a high speed, the control handle 90 always points in the same direction as the desired steered wheel position and the operator is provided with more steering resolution.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:
a frame comprising an operator's compartment;
wheels supported on said frame, at least one of said wheels being a steerable wheel;
a steer-by-wire system associated with said steerable wheel to effect angular movement of said steerable wheel about a first axis, said steer-by-wire system comprising:
a control handle capable of being moved by an operator to generate a steer control signal;
a selection switch capable of generating one of a first select signal and a second select signal, wherein said selection switch comprises a speed selection switch and said first select signal comprises a low speed select signal and said second select signal comprises a high speed select signal;
a steer motor coupled to said steerable wheel to effect angular movement of said steerable wheel about the first axis;
control apparatus coupled to said control handle to receive said steer control signal, coupled to said selection switch to receive said one select signal, and coupled to said steer motor to generate a first drive signal to said steer motor to effect angular movement of said steerable wheel about the first axis, and
said control apparatus converting said steer control signal to a corresponding desired angular position for said steerable wheel using one of first and second steerable wheel-to-control-handle-position ratios, wherein said one ratio is selected based on said one select signal.

2. A materials handling vehicle as set out in claim 1, wherein said control apparatus selects said first ratio when said one select signal is equal to said low speed select signal and said control apparatus selects said second ratio when said one select signal is equal to said high speed select signal, said first ratio being greater than said second ratio.

3. A materials handling vehicle as set out in claim 1, wherein said control apparatus changes said one steerable wheel-to-control handle-position ratio in response to said selection switch changing said one select signal and when said vehicle is stopped.

4. A materials handling vehicle as set out in claim 1, wherein said control apparatus changes said one steerable wheel-to-control handle-position ratio in response to said selection switch changing said one select signal, said control handle being located in a position within a first predefined range, said steerable wheel being located in a position within a second predefined range and an error between a desired angular position of said steerable wheel and a determined actual position of said steerable wheel is equal to or less than a predefined value.

5. The materials handling vehicle as set out in claim 4, wherein said first and second predefined ranges are equal to ±3 degrees of a centered position and said predefined value is equal to 3.

* * * * *